(12) United States Patent
Leong et al.

(10) Patent No.: US 6,301,567 B1
(45) Date of Patent: *Oct. 9, 2001

(54) LOCKBOX BROWSER SYSTEM

(75) Inventors: Sang Leong, Matawan; Teresa Cahill, Newton, both of NJ (US); Margaret J. Wren, Brooklyn, NY (US); Mary McCarthy, Dallas; Ilona Reyna, Spring, both of TX (US)

(73) Assignee: The Chase Manhattan Bank, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/174,031

(22) Filed: Oct. 16, 1998

(51) Int. Cl.[7] .................................................. G06F 17/60
(52) U.S. Cl. ............................... 705/33; 705/1; 705/18; 705/500; 705/30; 705/42; 705/44; 705/45
(58) Field of Search ................................... 705/33, 1, 18, 705/500, 30, 42, 44, 45

(56) References Cited

U.S. PATENT DOCUMENTS

| | | | |
|---|---|---|---|
| 4,554,418 | * 11/1985 | Toy | 379/88.01 |
| 4,855,906 | 8/1989 | Burke | 707/10 |
| 4,930,071 | 5/1990 | Tou et al. | 707/4 |
| 5,167,011 | 11/1992 | Priest | 706/62 |
| 5,177,342 | 1/1993 | Adams | 235/379 |
| 5,262,942 | 11/1993 | Earle | 705/37 |
| 5,326,959 | 7/1994 | Perazza . | |
| 5,412,753 | 5/1995 | Alston et al. | 706/11 |
| 5,461,624 | 10/1995 | Mazzola | 370/402 |
| 5,530,438 | 6/1996 | Bickham et al. | 340/825.34 |
| 5,586,218 | 12/1996 | Allen | 706/12 |
| 5,592,660 | 1/1997 | Yokota et al. | 707/8 |
| 5,615,110 | 3/1997 | Wong | 705/38 |
| 5,655,081 | 8/1997 | Bonnell et al. | 709/202 |

(List continued on next page.)

FOREIGN PATENT DOCUMENTS 9838558  9/1998  (WO) .

OTHER PUBLICATIONS

Gregg, Leigh, "CUs plan electronic bill–payment. (credit cunions)(includes related article on Credit Union National Association Mutual Group piloting bill–presentment program)", Nov.–Dec., 1997, Credit Union Executive, v37, n6, p4(6).*

Schroeder, Max, "Edify EBS The Wev into the World of High–Tech Banking", Apr. 1998, Computer Telephony, p141.*

Orenstein, Alison F, "First American Cuts reporting Time With Lockbox Center Conversion", Jul. 1997, Bank Systems & Technology, v34, n7, p63(1).*

(List continued on next page.)

Primary Examiner—Tariq R. Hafiz
Assistant Examiner—Akiba Robinson-Boyce
(74) Attorney, Agent, or Firm—Ostrolenk, Faber, Gerb & Soffen, LLP

(57) ABSTRACT

A method of providing information regarding lockbox receipts to a customer having a lockbox account, the method comprising the steps of: having alert criteria containing alert conditions selected by the customer; creating a database file for each of the receipts of the lockbox account which are received after the customer has selected the alert criteria, each of the files comprising a plurality of fields containing data relating to a respective one of the receipts, the alert criteria defining certain of the fields as containing data to be compared against the alert conditions; comparing the alert conditions with the data of the fields of the database files defined by the alert criteria; and alerting the customer that one or more of said files contain data that have met the alert criteria.

43 Claims, 22 Drawing Sheets

U.S. PATENT DOCUMENTS

| | | | |
|---|---|---|---|
| 5,708,422 | | 1/1998 | Blonder et al. ............... 340/825.34 |
| 5,740,549 | | 4/1998 | Reilly et al. ........................ 705/14 |
| 5,768,119 | * | 6/1998 | Havekost et al. .................... 700/4 |
| 5,790,793 | | 8/1998 | Higley .............................. 709/218 |
| 5,793,301 | | 8/1998 | Patterson, Jr. et al. ...... 340/825.26 |
| 5,796,832 | | 8/1998 | Kawan ............................... 705/65 |
| 5,796,952 | | 8/1998 | Davis et al. ..................... 709/224 |
| 5,978,779 | * | 11/1999 | Stein et al. ......................... 705/37 |
| 6,003,076 | * | 12/1999 | Maruyama et al. ............. 709/223 |

OTHER PUBLICATIONS

"Next Step After Iage Installation: Archival Rehab", Oct. 13, 1994, Item Processing Report, v5, n20.* http://www.linuxsecurity.com/articles/vendors_products_article-1367.html, Ryan W. Maple, "Guardian Digital Introduces The Linux Lockbox Secure E-Business Solution", Aug. 16, 2000, Guardian digital, Inc.* http://www.turbopower.com/products/lockbox/details/, "Inside LockBox 2, Hashing, digital signatures, advanced algorthims and more".* http://yourlockbox.com/.*

Roving Software, Inc., Mar. 13, 1998 Turnkey Active Personalization for Web Commerce at http.//www.roving.com/home.htm.

NationsBank web page, Nov. 10, 1997, (one page).

Meca Software LLC, Press Release, Dec. 9, 1997, "Meca and Sun Unveil Their First Internet-Based Banking Software", (one page).

Press Release NationsBank, Nov. 7, 1997, "NationsBank Launches Nations Direct, and Internet-based Transactions and Information Network", (three pages).

Press Release NationsBank, Nov. 12, 1997, "Using Technology to Gain a Competitive Edge", pp. 1–63.

Article from American Banker, Jan. 31, 1998, "More Bankers Support Push Technology Despite Risks", (two pages).

Information Week, May 19, 1997, pp. 63–64, 72 and 76, "Browsers for E-Mail".

Information Week, May 5, 1997, p. 198, "The Incredible Shrinking Bandwidth".

Information Week, Apr. 21, 1997, p. 28, "Netscape Adds Push Component".

Information Week, May 12, 1997, p. 60, "Barnes & Noble Ventures Online".

Magazine Article, Apr. 1997, pp. 4–6, "Banks Get Pushy".

Wired Magazine, Mar. 1997, "PUSH!", (thirteen pages).

Information Week, Dec. 15, 1997, pp. 111, 112, and 114, "Lost in the Translation".

Information Week, Dec. 15, 1997, pp. 48, 52, "Explorer Gains Fame".

Information Week, undated, (one page), "Documents Get A Push".

Brochure of Wayfarer Communications, Incisa Product, (three pages) (1997).

Brochure of Back Web, "Push The Information. The Enterprise. The Technology.", (six pages) (undated).

Unidirect Advertisement for "Spatch" by the Hyde Company, (p. 15) (undated).

Information Week, Mar. 2, 1998, p. 30, "Battle Is On To Prove Push's Value".

D. Reyes (Chase Manhattan Bank) "Receivables and Lockbox"—Treasury Management International, Jul. 1998.

Carnprobst B. et al., "Lockbox Solutions That Improve The Application Rate" Work Process Improvement Today, U.S. Boston, MA, Mar. 1, 1996 pp. 12–14.

* cited by examiner

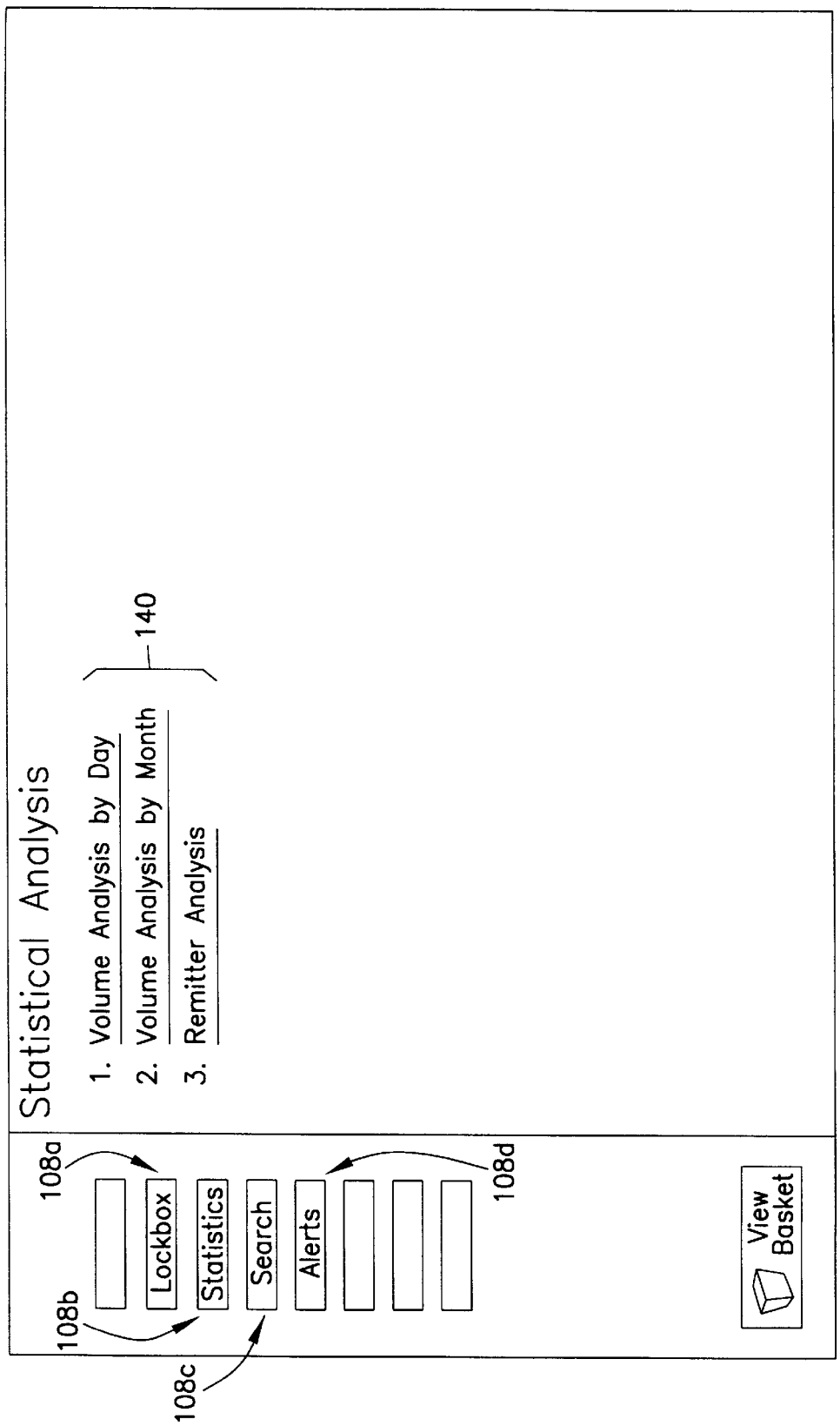

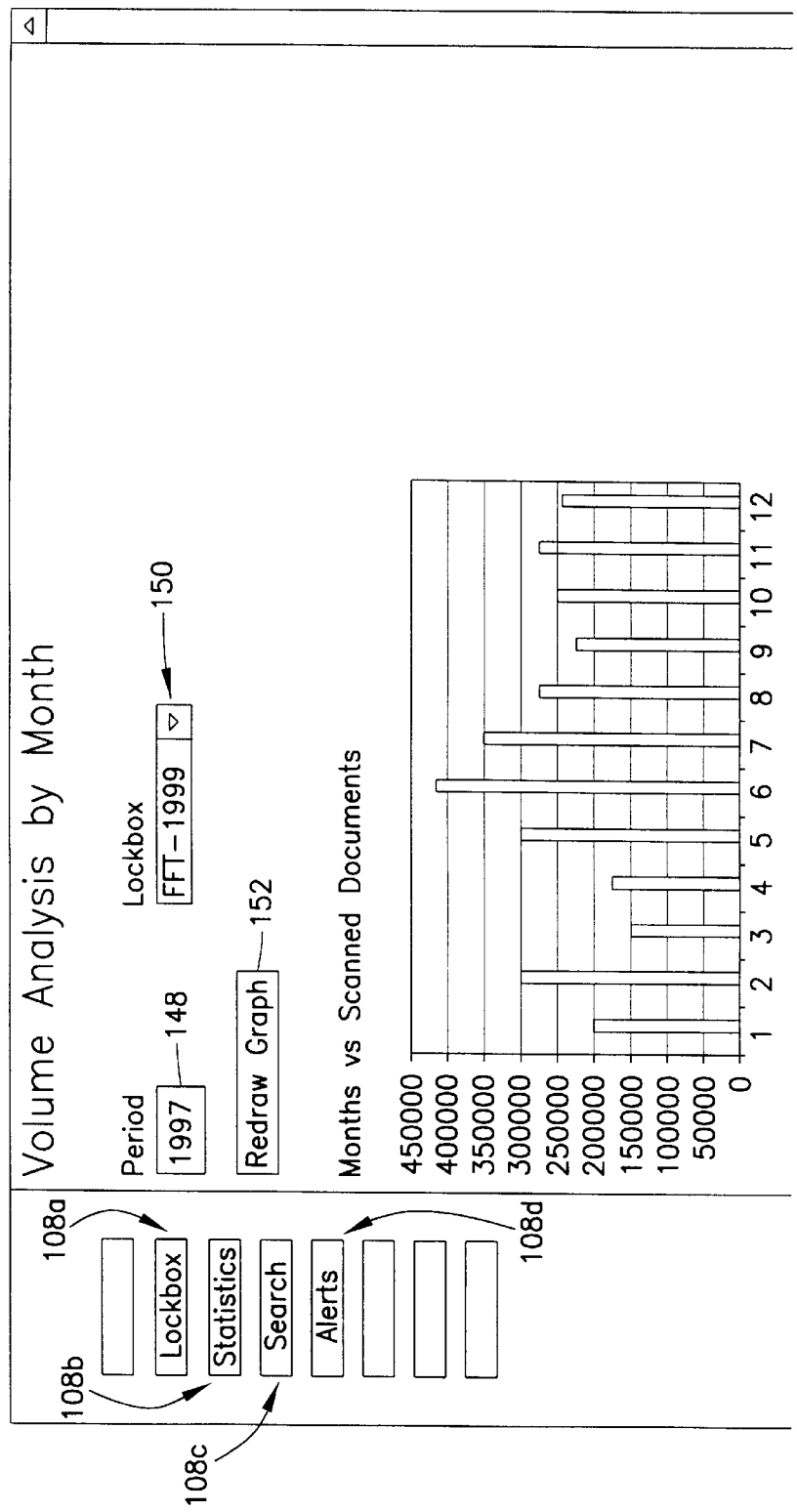

Search Results

| Location | Date | Lockbox | Batch | Seq # | Amount | Remitter Name |
|---|---|---|---|---|---|---|
| ⊙ Hong Kong | 23/07/1998 | 1234 | 1 | 1 | 1000.00 | Arthur Smith |
| ⊙ Hong Kong | 23/07/1998 | 1234 | 1 | 3 | 1234.00 | Peter Smith |
| ⊙ Hong Kong | 23/07/1998 | 1234 | 3 | 1 | 2.22 | Arthur Smith |
| ⊙ Hong Kong | 23/07/1998 | 1234 | 1 | 2 | 2000.00 | Charles Smith |
| ⊙ Hong Kong | 23/07/1998 | 1234 | 2 | 2 | 3.00 | Peter Smith |
| ⊙ Hong Kong | 23/07/1998 | 1234 | 5 | 9 | 249707.00 | Peter Smith |
| ⊙ Hong Kong | 23/07/1998 | 1234 | 4 | 2 | 25518.60 | Peter Smith |
| ⊙ Hong Kong | 23/07/1998 | 1234 | 4 | 3 | 300.00 | Arthur Smith |
| ⊙ Hong Kong | 23/07/1998 | 1234 | 5 | 3 | 4509.10 | Peter Smith |
| ⊙ Hong Kong | 23/07/1998 | 1234 | 5 | 4 | 50.00 | Arthur Smith |

Get Records 1–10

STORED ALERT CRITERIA

Alerts

| SN | Date | Description | Matches New | Old |
|---|---|---|---|---|
| △ | 14 Jul 1998 | Check for invoice #YHM137565651 —222 | 1 | 0 |
| △ | 14 Jul 1998 | Checks from Arthur Smith —224 | 0 | 0 |
| △ | 14 Jul 1998 | Payments more than $2000 —226 | 0 | 5 |
| △ | 14 Jul 1998 | List of deposits to Frankfurt Lockbox —228 | 1 | 1 |
| △ | 14 Jul 1998 | Last weeks Deposits —230 | 1 | 0 |
| △ | 14 Jul 1998 | Last months Deposits to Hong Kong Lockbox —232 | 2 | 3 |
| △ | 14 Jul 1998 | Payments for invoice numbers starting with #NVI —234 | 2 | 2 |

270

Delete Selected ▷ Go
250

108a — Lockbox
108b — Statistics
108c — Search
108d — Alerts

View Basket

ALERT PAGE (NOTIFICATION)

| Location | Date | Lockbox | Batch | Seq # | Amount | Remitter Name |
|---|---|---|---|---|---|---|
| Hong Kong | 11/06/1998 | 0088 | 6 | 2 | 1.00 | Arthur Smith |
| Hong Kong | 11/06/1998 | 0088 | 6 | 1 | 123459789. | Arthur Smith |
| Hong Kong | 11/06/1998 | 0088 | 6 | 3 | 2.00 | Arthur Smith |
| Hong Kong | 11/06/1998 | 0088 | 6 | 4 | 3.00 | Arthur Smith |
| Hong Kong | 12/06/1998 | 0088 | 10 | 2 | 0.01 | Arthur Smith |
| Hong Kong | 12/06/1998 | 0088 | 12 | 2 | 0.01 | Arthur Smith |
| Hong Kong | 12/06/1998 | 0088 | 12 | 1 | 12.34 | Arthur Smith |
| Hong Kong | 12/06/1998 | 0088 | 10 | 1 | 123456678.9 | Arthur Smith |

▽ 14 Jul 1998   List of deposits to Frankfurt Lockbox   1   1

| Location | Date | Lockbox | Batch | Seq # | Amount | Remitter Name |
|---|---|---|---|---|---|---|
| Hong Kong | 11/06/1998 | 0088 | 6 | 2 | 1.00 | Arthur Smith |
| Hong Kong | 11/06/1998 | 0088 | 6 | 1 | 123456789. | Arthur Smith |

▽ 14 Jul 1998   Last weeks Deposits   1   0

| Location | Date | Lockbox | Batch | Seq | Amount | Remitter Name |
|---|---|---|---|---|---|---|
| Hong Kong | 12/06/1998 | 0088 | 12 | 1 | 12.34 | Arthur Smith |

View Basket

Fig. 19B

LOCKBOX BROWSER SYSTEM

BACKGROUND OF THE INVENTION

1. Field of the Invention

The present invention relates to methods and systems for providing information over a network to a user of the network and, more particularly, to methods and systems for providing data searching, alert notification, and automated data presentation functions to customers of financial services.

2. Related Art

Traditionally, persons receiving relatively large numbers of negotiable instruments, for example checks, obtained one or more so-called lockboxes to receive the checks. Frequently, lockboxes are located at Post Offices and the checks for a particular person are delivered to a designated lockbox or lockboxes in one or more Post Offices. Alternatively, the lockbox may be a designated address at a financial institution which processes the received checks.

Usually, persons receiving large numbers of checks are business concerns who also seek financial services. Indeed, these business concerns desire one or more checking accounts to receive the proceeds from the checks and, thereafter, draw proceeds from the checking accounts via withdrawals. Providers of financial services for these business concerns have recognized that it is desirable to provide certain information regarding the checks (or receipts) received in a lockbox to the business concern. Such information consist of particular parameters of the checks, for example, the remitter name, serial number, bank number, routing number, payment amount, etc. This information is typically gathered and stored in a computer database.

Storage of the information in a computer database is usually accomplished by entering values of the parameters relating to the checks into an index file containing fields. The index files are then appropriately addressed and cross cataloged such that they may be retrieved on command and the information contained therein may be provided to a customer (e.g., a business concern) of the financial service provider.

Image files of the checks delivered to a particular lockbox are also produced and stored such that they may later be accessed by the financial service provider or customer.

Although financial service providers have been able to provide customers with the ability to search the databases containing the index and image files, it has not been possible heretofore to perform analytic analyses on the data contained in the image files and provide the results of the analytic analyses to the customer. Further, it has not been possible to automatically alert a customer that a particular check has been received in the lockbox or that some other condition which is a function of the data in the index files has been met. Still further, it has not been possible to automatically adjust an interface between the database and the customer such that the so-called "look and feel" of the interface is personalized to the preferences of the user.

SUMMARY OF THE INVENTION

In order to overcome the deficiencies of the prior art, one aspect of the instant invention is directed to a method of providing information regarding lockbox receipts to a customer having a lockbox account, the method including the steps of: having alert criteria containing alert conditions selected by the customer; creating a database file for each of the receipts of the lockbox account which are received after the customer has selected the alert criteria, each of the files comprising a plurality of fields containing data relating to a respective one of the receipts, the alert criteria defining certain of the fields as containing data to be compared against the alert conditions; comparing the alert conditions with the data of the fields of the database files defined by the alert criteria; and alerting the customer that one or more of said files contain data that have met the alert criteria.

According to another aspect of the instant invention, a method of providing information regarding lockbox receipts to a customer having a lockbox account, includes the steps of creating a database file for each of the receipts of the lockbox account, each of the files comprising a plurality of fields containing data relating to a respective one of the receipts; and producing a chart in which the information regarding the lockbox receipts is presented as a function of the data of at least one field.

According to yet another aspect of the instant invention, a method of providing information to computer network users includes the steps of: providing at least first and second screen formats, each screen format being designated to provide at least part of the information to a respective user, one of the first and second screen formats being provided prior to the other in accordance with a command from the user; monitoring numbers of times that the user commands that each of the first and second screen formats be provided; and automatically providing one of the first and second screen formats prior to the other without a command from the user as a function of the numbers of times that the user commands that the first and second screen formats be provided.

According to still another aspect of the instant invention a method of providing information to computer network users includes the steps of: providing respective users with options to receive one or more screen formats on command from a plurality of screen formats, each screen format being designated to provide at least part of the information to a respective user; monitoring numbers of times that the respective users command that each of the plurality of screen formats be provided; and automatically altering the option of a respective user to receive a certain one of the plurality of screen formats as a function of the number of times that the respective user commands that the certain screen format be provided.

According to another aspect of the instant invention a method of providing information to computer network users includes the steps of: classifying the network users into a plurality of groups; storing a plurality of different sets of screen formats, each set of screen formats being designated to provide the information to a respective one of the groups of users; and providing one of the sets of screen formats to a particular network user on command based on the user's group classification.

Other objects, features, and advantages will become apparent to one skilled in the art from the instant disclosure.

BRIEF DESCRIPTION OF THE DRAWINGS

For the purpose of illustrating the invention, there are shown in the drawing forms which are presently preferred, it being understood, however, that the invention is not limited to the precise arrangements and instrumentalities shown.

FIG. 11 is another screen format provided by the system shown in FIG. 1 to a user;

FIG. 16 is another screen format provided by the system shown in FIG. 1 to a user;

FIG. 17 is another screen format provided by the system shown in FIG. 1 to a user;

DETAILED DESCRIPTION OF THE PREFERRED EMBODIMENTS

Figure 1:
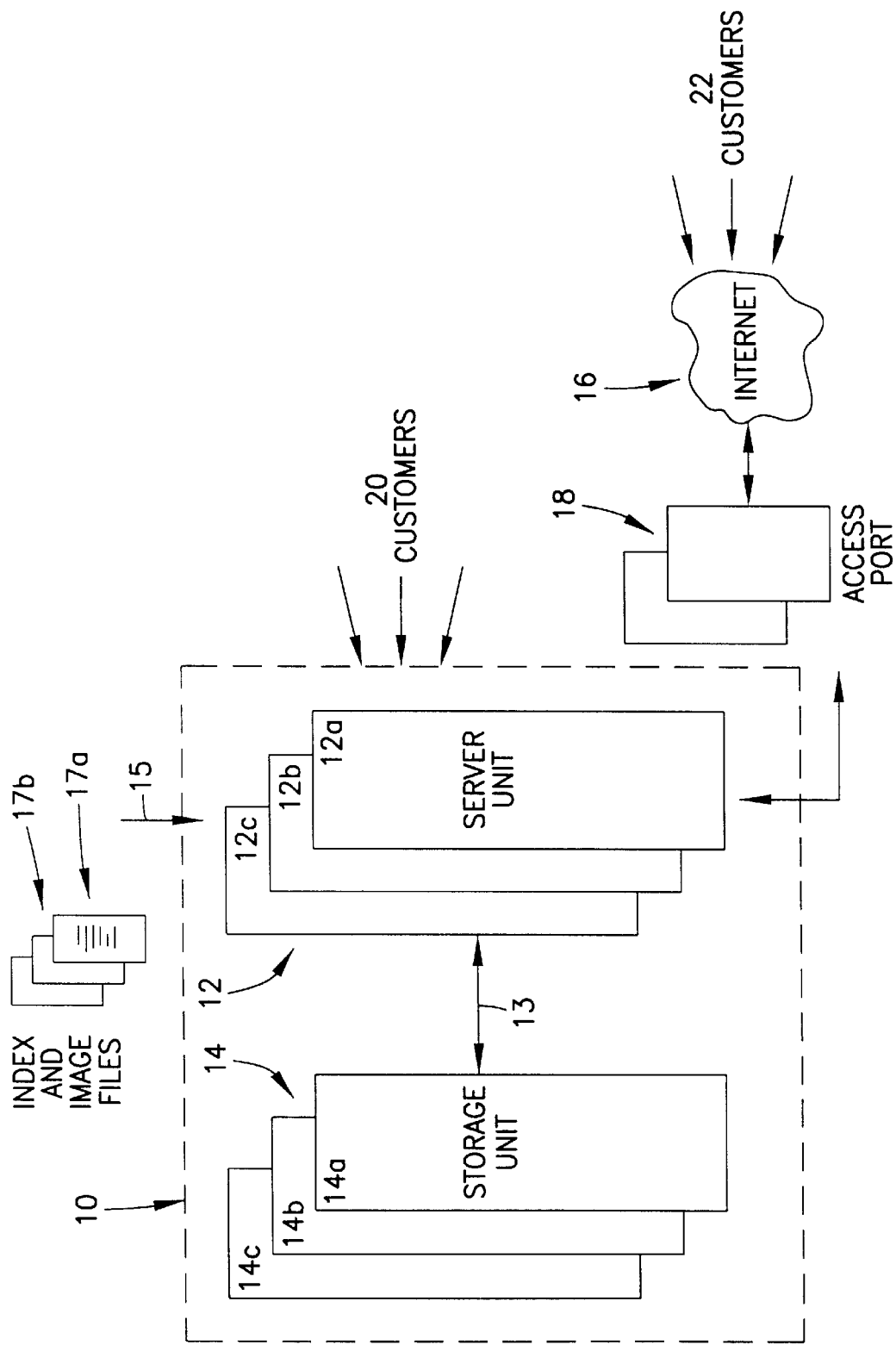
FIG. 1 is a block diagram showing a system capable of providing the functions of the instant invention.

Referring now to the drawing wherein like numerals indicate like elements, there is shown in FIG. 1 a system 10 for providing financial services, for example lockbox services, to a plurality of customers 20, 22.

The system 10 preferably includes a server apparatus 12 and a storage unit 14. Internal customers 20, for example persons employed by the financial service provider of the system 10, are preferably permitted to access the server unit 12 through a private communication system such as an Intranet. External customers 22 may be clients of the financial service provider of the system 10 and preferably access the server unit 12 over a public communication system such as the Internet 16.

As access to the server unit 12 by the external customers 22 raises security issues and also provides an opportunity to interact with those customers 22, an Internet gateway access port 18 is preferably provided. The access port 18 preferably provides security functions (e.g., user ID and password functions), help desk functions, e-mail services and the like.

The system 10 need not include a separate server unit 12 and storage unit 14, rather, those elements may be combined into one integral unit. Alternatively, those skilled in the art will recognize that server unit 12 may take the form of multiple server units 12a, 12b, 12c, etc., coupled together via one or more communication links. Similarly, the storage unit 14 may take the form of multiple storage units 14a, 14b, 14c, etc., coupled to the server unit 12 via one or more communication links 13.

It has been found that Sun Enterprise 5500 servers utilizing the Sun Solaris 2.6 operating system provide a suitable platform for implementing the server unit 12. In order to provide access to external customers 22 via the Internet 16, a suitable web server software program, for example Netscape, may be provided. In order for the server unit 12 to interface with the storage unit 14 via the communication link 13, a database server may be provided utilizing a Sun Enterprise 5500 server operating under the control of Oracle 8.X software.

A suitable platform for implementing the storage unit 14 may be obtained using an IBM SP2/RS 6000 storage unit, also known as the IBM OnDemand product. The storage unit 14 may include any of the known data storage devices, such as magnetic disks, magnetic tape, optical storage units, or the like. When data is to be stored for relatively short periods of time, for example 0 to 90 days, a magnetic disk storage unit may be used. When data is to be stored for a relatively long period of time, for example 91 days to 7 years, magnetic tape storage units may be used. As will be apparent to those skilled in the art, one or more types of storage units may be used in the storage unit 14, for example, both magnetic disk units and magnetic tape units. In any event, the invention is not limited to the type or number of storage units utilized.

Image and Data Storage

System 10 provides a means for storing both image data files 17a and index data files 17b on a substantially periodic basis for later access by customers 20, 22. The image files 17a and index files 17b represent information contained in receipts associated with financial services provided to the external customers 22. It is preferred that the financial services provided by system 10 include providing one or more lockboxes to each of a plurality of external customers 22. Further, it is preferred that the receipts associated with the lockboxes are negotiable instruments, such as checks and that the external customers 22 have one or more accounts with the financial service provider, such as checking accounts for receiving the proceeds from the remitted checks.

The image files 17a and index files 17b preferably represent information from the receipts (e.g., checks) which are deposited in the lockboxes. A separate imaging system (not shown) prepares image files 17a which are electronic versions of the checks. The imaging system also prepares image files 17a of associated documents (e.g., copies of invoices, letters, etc.) received in connection with the checks. For example, a particular check may be a payment, pursuant to an invoice, for goods or services provided by the external customer 22. A separate image file 17a of the invoice is preferably created (or may be made part of the image file 17a of the associated check).

Another system (not shown) creates the index files 17b each having a plurality of fields which contain data relating to respective checks, lockboxes, customers, and customer accounts. It is preferred (but not required) that the fields contain data relating to the following information:

a remitter name of the check, a serial number of the check, a bank number of the check, a routing number of the check, a payment amount of the check, a checking account number of the customer into which the payment amount is deposited, a posting date on which the payment amount is deposited into the checking account of the customer, a clearing date on which the payment amount clears, a lockbox number in which the check is received, a location of the lockbox, an ON-US account number into which the check is deposited, a batch number for a batch of checks of which the check is apart, a sequence number of the batch for the check, a release time for the batch number, an aggregate payment amount of the batch, a number of an invoice associated with the check, a currency type of the check, a processing date of the check; and a document type of an image file of the check.

The external customers 22 typically receive many checks in their respective lockboxes, and as a result, the checks are processed in batches of typically 50 checks per batch. Further, each check is typically provided with a sequence number within the batch. Accordingly, it is preferred that the index file 17b for each check also include a batch number for a batch of checks of which the particular check is a part, a sequence number of the batch for the particular check, a release time for the batch number, and an aggregate of the payment amounts of the checks within the batch.

Once the image files 17a and index files 17b for a check or batch of checks are prepared, they are input to the system 10 via access port 15. The server unit 12 ensures that the image files 17a and index files 17b are properly addressed and cross-referenced for later retrieval from the storage unit 14.

The image files 17a and index files 17b input to system 10 via port 15 may be stored in a short term (or local) data storage unit within the server unit 12 for some predetermined time, for example, one to two days and then may be moved to longer term storage in the storage unit 14. It is preferred that the index files 17b be retained in the server unit 12 (i.e., within a data storage unit) indefinitely to facilitate searching functions while the image files 17a are moved to the storage unit 14.

Image files 17a (and index files 17b if any) stored in storage unit 14 are preferably moved from a magnetic disk unit to a magnetic tape unit after approximately 90 days. Accordingly, when an external customer 22 requests information contained in files 17a, 17b which have been stored in storage unit 14 for longer than, for example, 90 days, there will be some delay in obtaining the files from the storage unit 14.

It is preferred that the system 10 provide browsing functions, searching functions, analysis functions, and alerting functions to the customers 20, 22. It is preferred that the external customers 22 access the functions of the system 10 over the Internet 16 using a suitable browsing program, for example, Netscape.

User Interface

Figure 2:
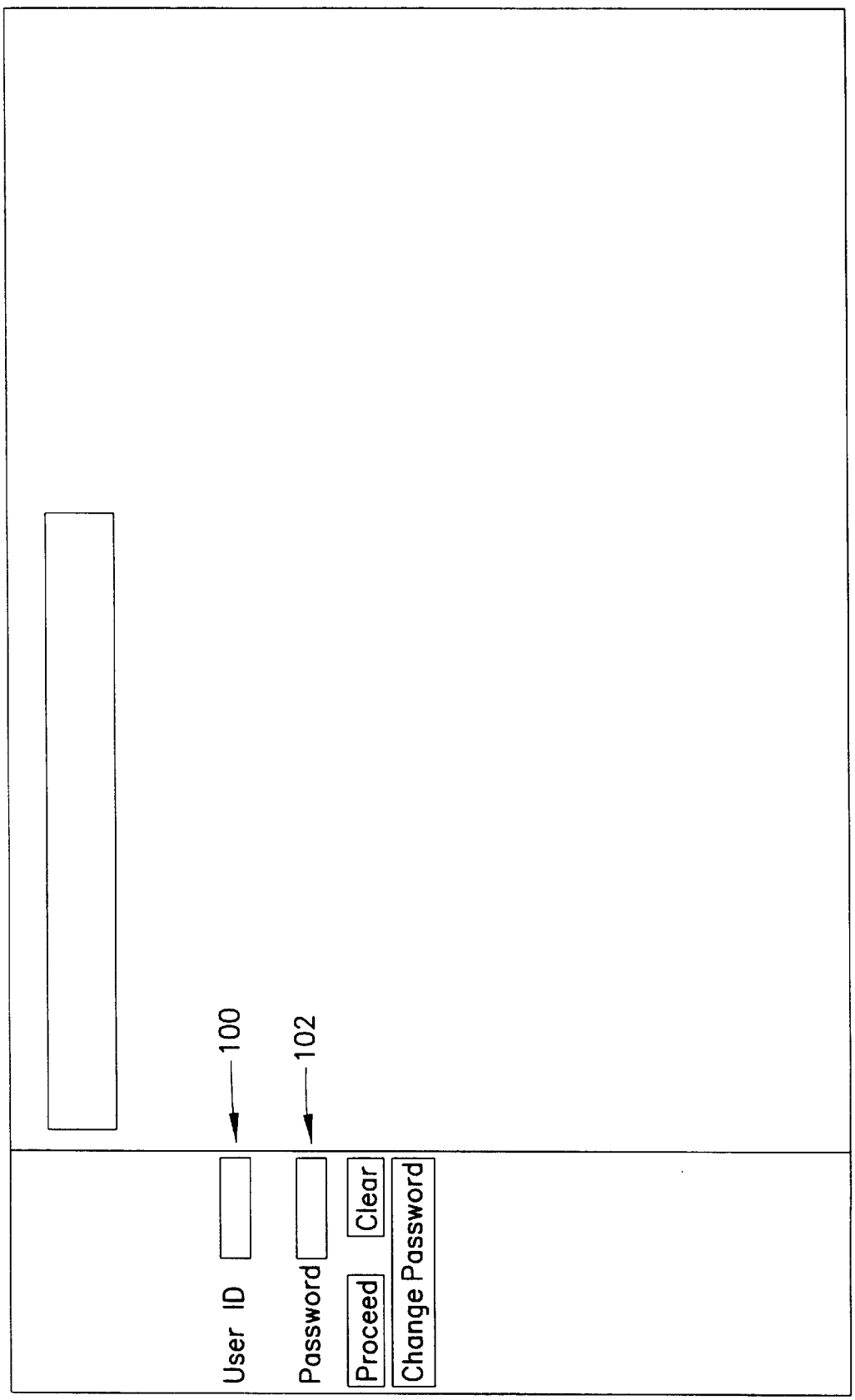
FIG. 2 is an example of a screen format provided by the system shown in FIG. 1 to a user.

Reference is now made to FIG. 2 which shows a screen format (for example, an HTML file) provided by the server unit 12 to a particular external customer 22 over the Internet 16. A similar procedure may be followed by an internal customer 20 (using, for example, an Intranet), although the specific options, sequences and screens may vary as desired.

To access the screen format shown in FIG. 2, the external customer 22 would utilize their browser program to access a website which is maintained by the financial services provider offering use of the system 10 to its customers 20, 22. In the preferred embodiment, the external customer 22 enters its user ID 100 and password 102 in order to access the system 10. Verification of the user ID 100 and password 102 is preferably carried out by the Internet access gateway 18; however, this function need not be carried out by a separate system and could be performed directly by the system 10.

Figure 3:
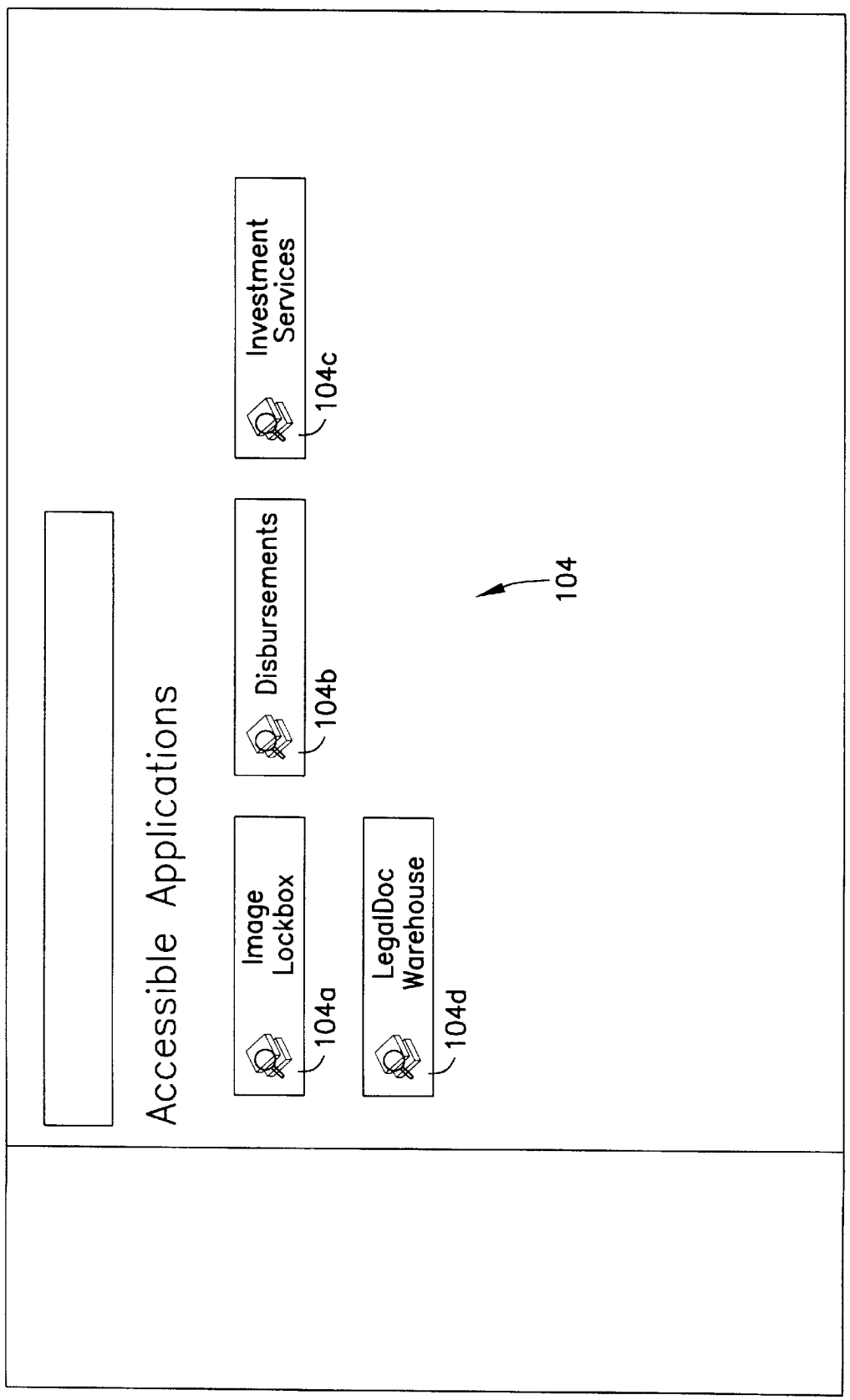
FIG. 3 is another screen format provided by the system shown in FIG. 1 to a user.

Reference is now made to FIG. 3 which shows a screen format which is provided by the system 10 to the external customer 22 after the customer's user ID 100 and password 102 have been verified. This screen format provides access to several accessible applications, namely an image lockbox application, a disbursement application, an investment services application, and a legal document warehouse application. The accessible applications are designated by one or more icons 104a, 104b, 104c, and 104d. As is known in the art, the external customer 22 utilizes a pointing device, such as a mouse pointer, to "click" on one of the icons 104 to invoke the corresponding application. To invoke the lockbox application, the customer 22 will click on icon 104a.

Lockbox Application

Figure 4:
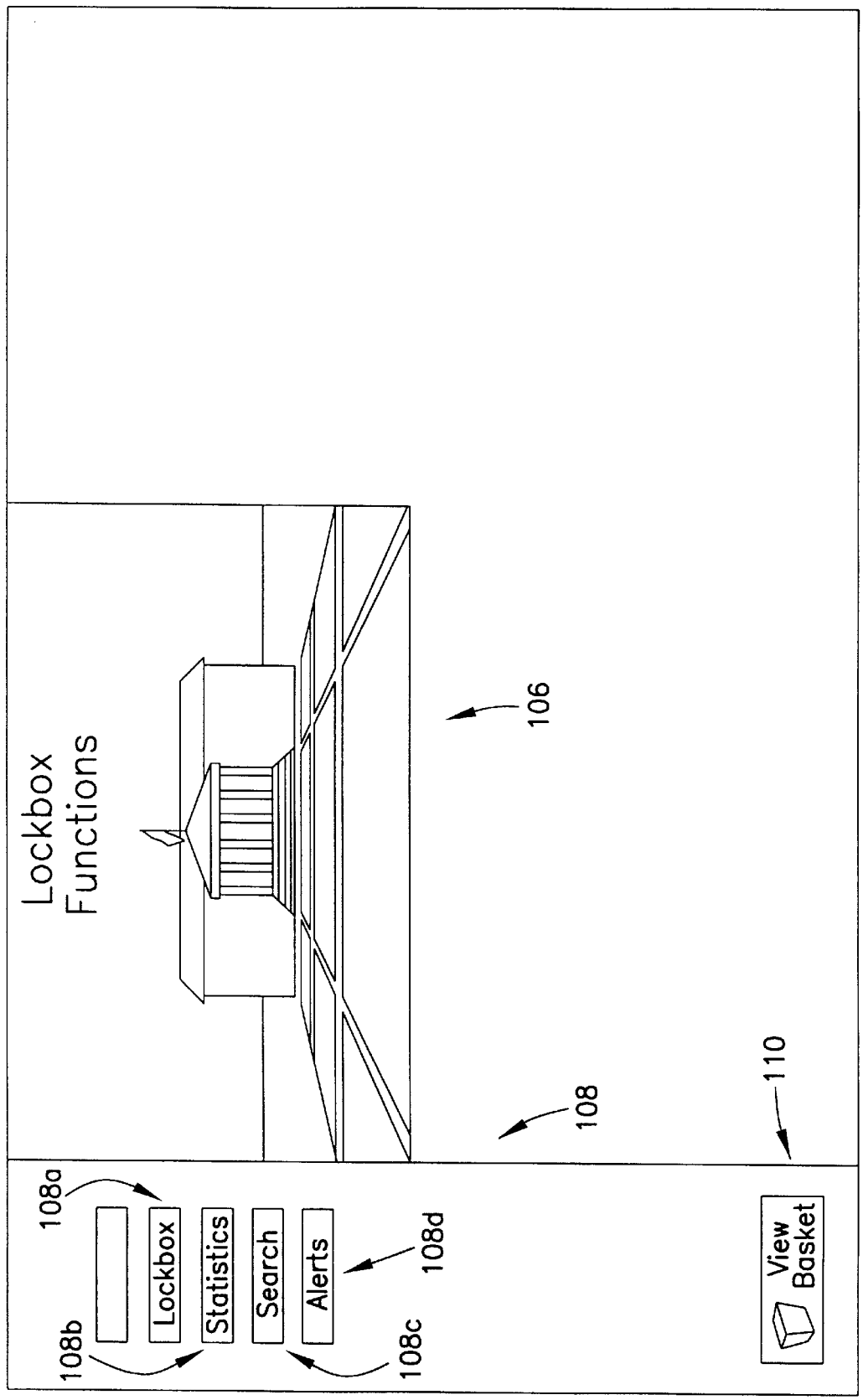
FIG. 4 is another screen format provided by the system shown in FIG. 1 to a user.

Referring to FIG. 4, the system 10 preferably provides a screen format to the external customer 22 when the image lockbox icon 104a is selected. The screen format of FIG. 4 displays a greeting 106 or other form of indicia and provides one or more icons 108 for invoking various functions of the system 10. These functions include, for example, lockbox details, statistics functions, searching functions, and alert functions. The screen format also provides a "View Basket" icon 110 which permits the external customer 22 to view the screen formats resulting from invoking one or more of the functions designated by icons 108.

Lockbox Details

Figure 5:
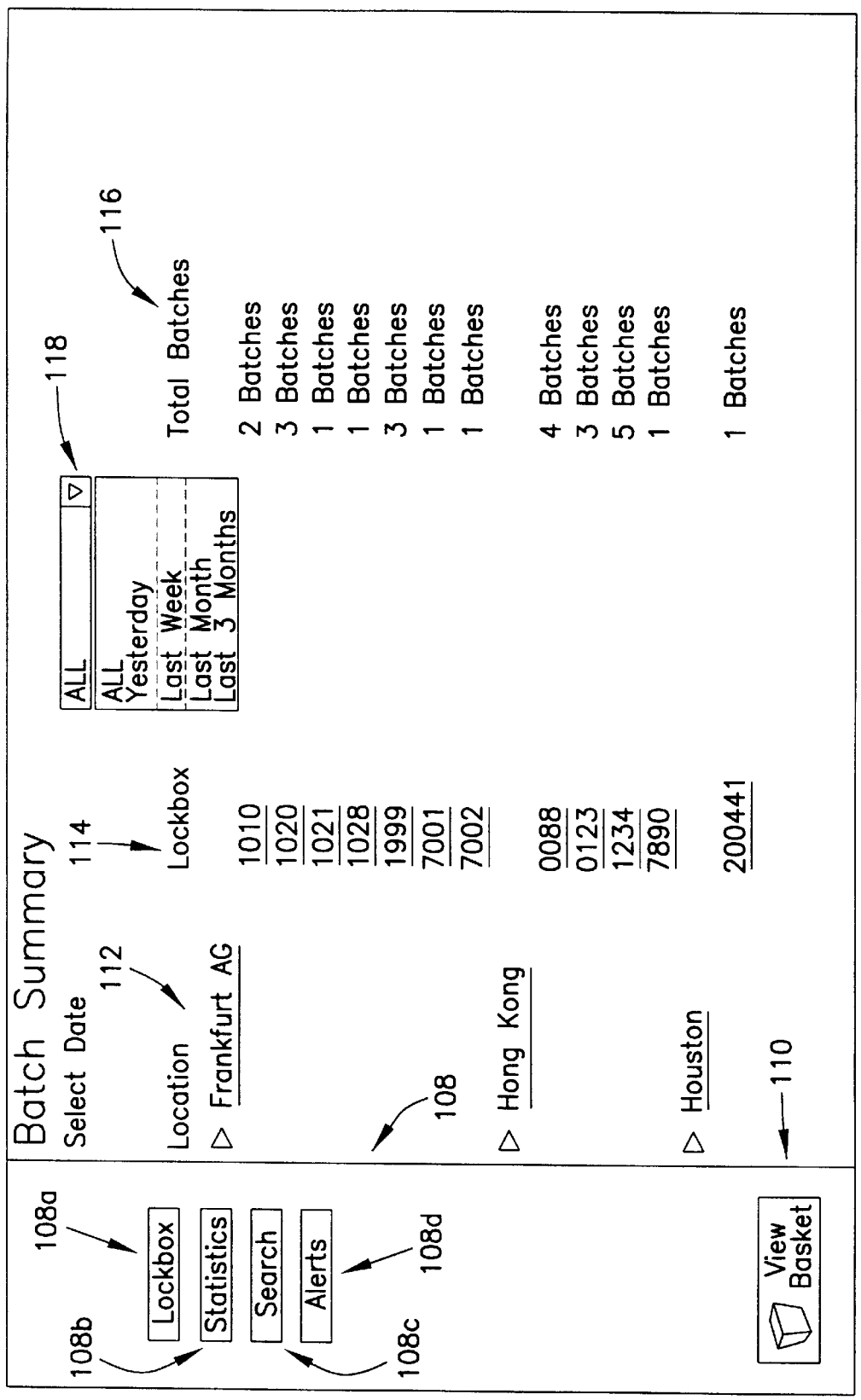
FIG. 5 is another screen format provided by the system shown in FIG. 1 to a user.

With reference to FIG. 5, a screen format is shown which is delivered by the system 10 to the external customer 22 in response to the customer's invocation of the lockbox details icon 108a. The screen format of FIG. 5 shows a batch summary of the one or more lockboxes for a particular external customer 22. The batch summary includes a tabulation of lockbox locations 112, lockbox numbers 14, and the total number of batches 116 associated with each respective lockbox. The batch summary is tailored to show the data pertaining to a specific date 118 or period of time, for example, the previous day, the previous week, the previous month, the previous three months, or the like.

In the example illustrated, the customer 22 selected a batch summary for the checks received in his lockboxes for the "last week" (i.e., the previous week). As shown in FIG. 5, the external customer 22 received checks in twelve of its lockboxes, seven of which are located in Frankfurt (identified by lockbox numbers 1010, 1020, 1021, 1028, 1999, 7001, and 7002), four of which are located in Hong Kong (identified by lockbox numbers 0088, 0123, 1234, and 7890), and one of which is located in Houston (identified by lockbox number 200441).

Each of the lockboxes 114 receive batches of checks (typically containing up to 50 checks each). Lockbox number 1010 received two batches of checks while lockbox 1020 received three batches of checks and so-on.

Figure 6:
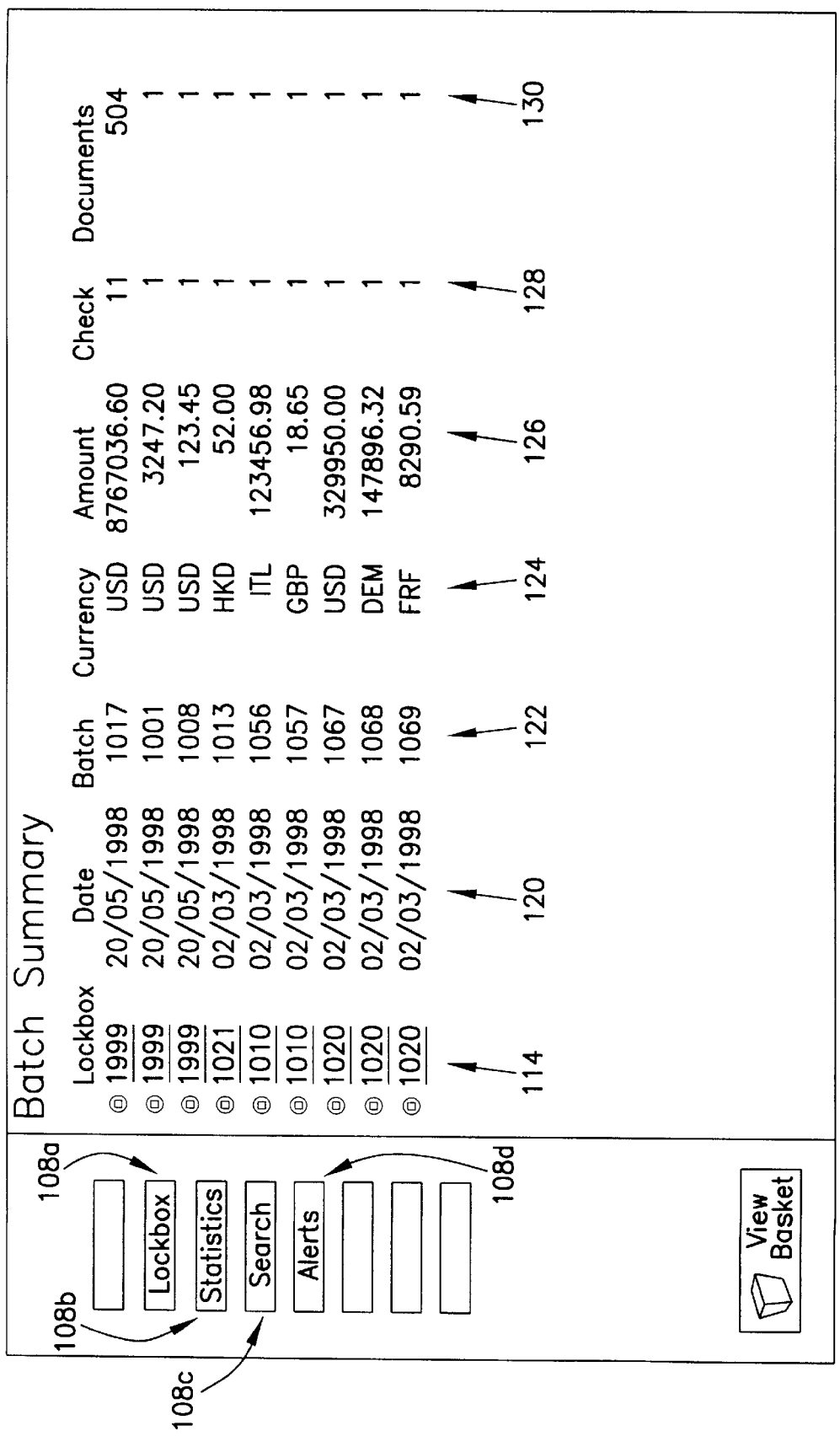
FIG. 6 is another screen format provided by the system shown in FIG. 1 to a user.

With reference to FIG. 6, the batch summary information may be presented in an alternative screen format showing lockbox number processing date 120, the specific batch number 122, the currency type 124 of the check, the payment amount 126 of the check, the check sequence number 128 in the particular batch, and the aggregate number of other documents 130 (such as invoices, purchase orders, etc.) associated with the checks. Other formats may be used.

Figure 7:
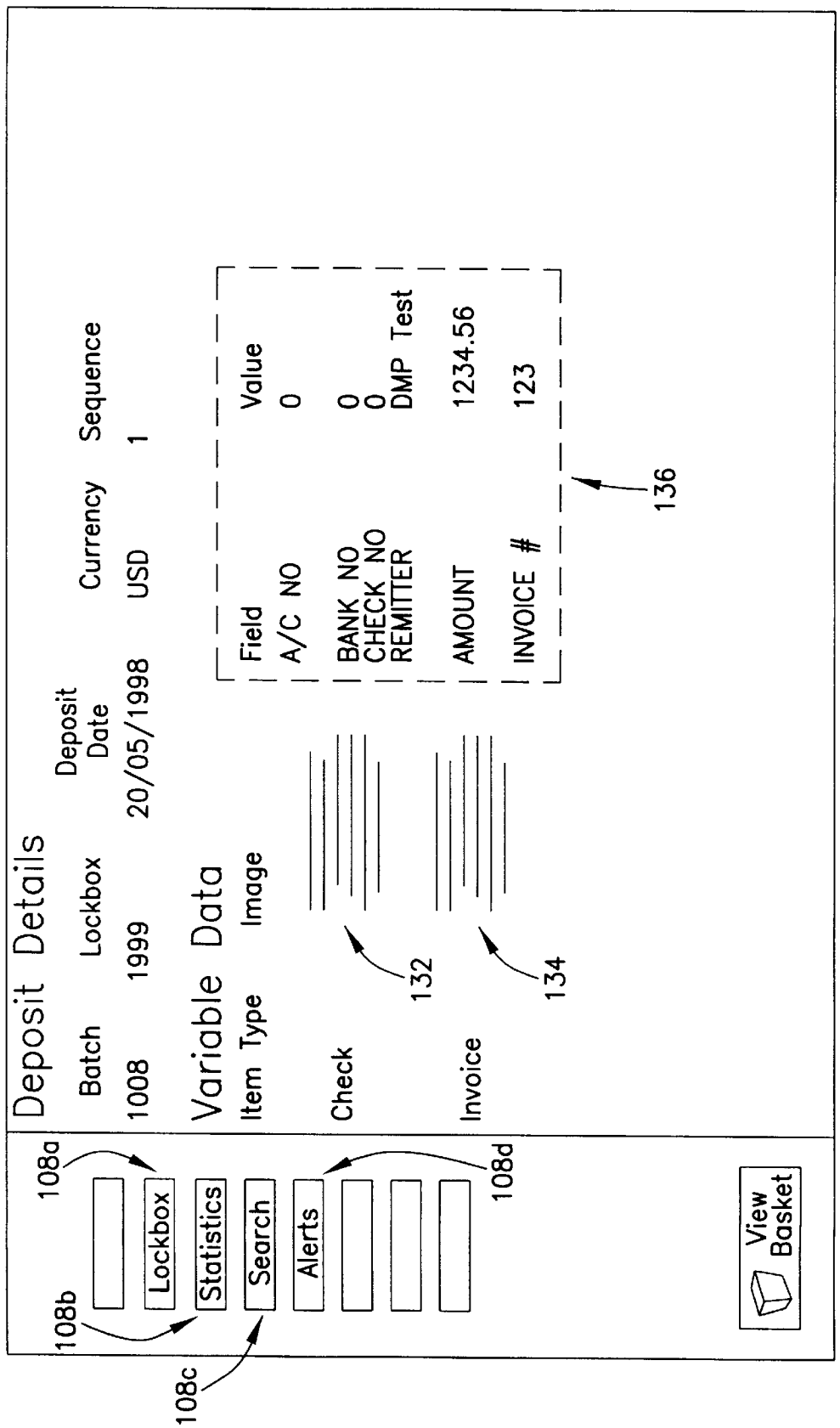
FIG. 7 is another screen format provided by the system shown in FIG. 1 to a user.

The external customer 22 may view additional details regarding a particular check by, for example, clicking on a particular check or icon. FIG. 7 shows a screen format providing information on a check (sequence number 1) of batch 1008 of lockbox number 1999. Since the external customer 22 specified that an image file 17*a* be provided (it could have requested data only), the server unit 12 retrieved the image file 17*a* associated with the selected check from the storage unit 14 and provided the information contained in the image file 17*a* on the screen format at location 132. As discussed above, the system 10 is capable of receiving, storing, and retrieving other image files 17*a* containing image information on, for example, invoices, letters, purchase orders, etc., associated with a particular check and provide images of those associated documents in the screen format, see location 134.

In addition to image information, the information contained in the index file 17*b* associated with the check is also presented in the screen format at location 136. As discussed above, the index file 17*b* contains a number of fields having values (or data) specific to the check. Here, the displayed fields include the customer account number, the bank number, the check number, the remitter name, the payment amount, and the invoice number. Other fields (or data) may be shown in addition to or in lieu of this data.

Figure 8:
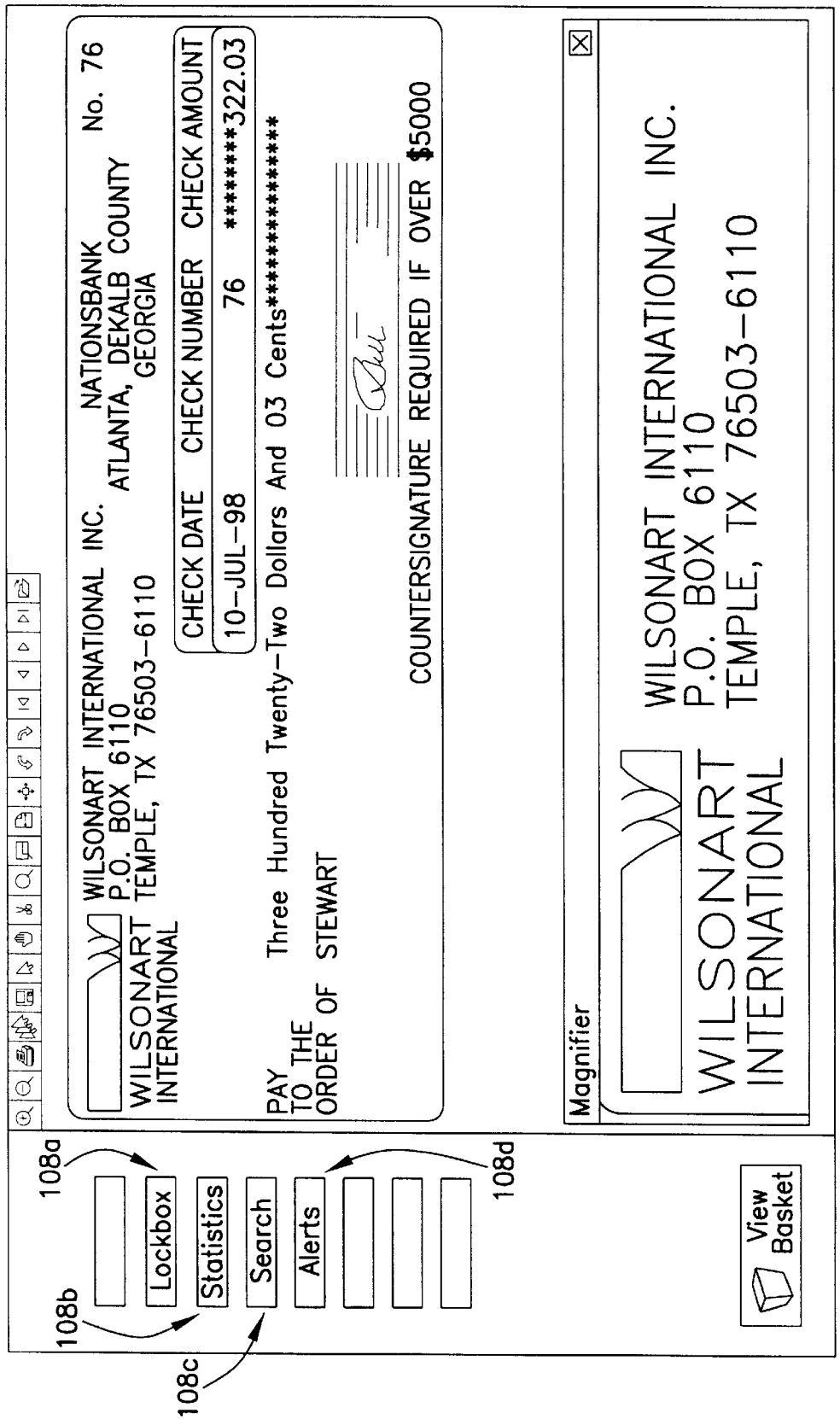
FIG. 8 is another screen format provided by the system shown in FIG. 1 to a user.

With reference to FIG. 8, the image data 132 may be enlarged and manipulated using known graphics software.

Figure 9:
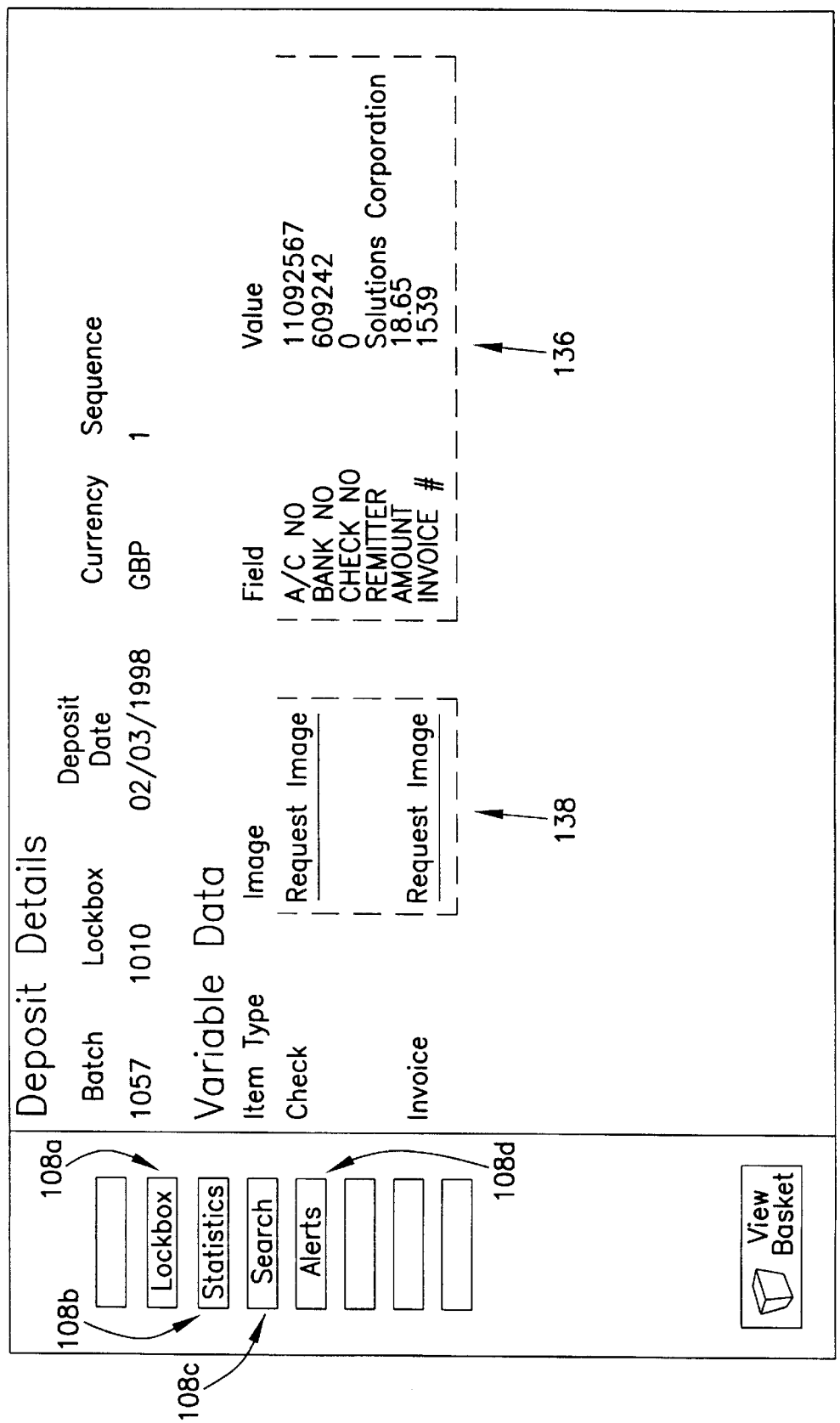
FIG. 9 is another screen format provided by the system shown in FIG. 1 to a user.
Figure 10:
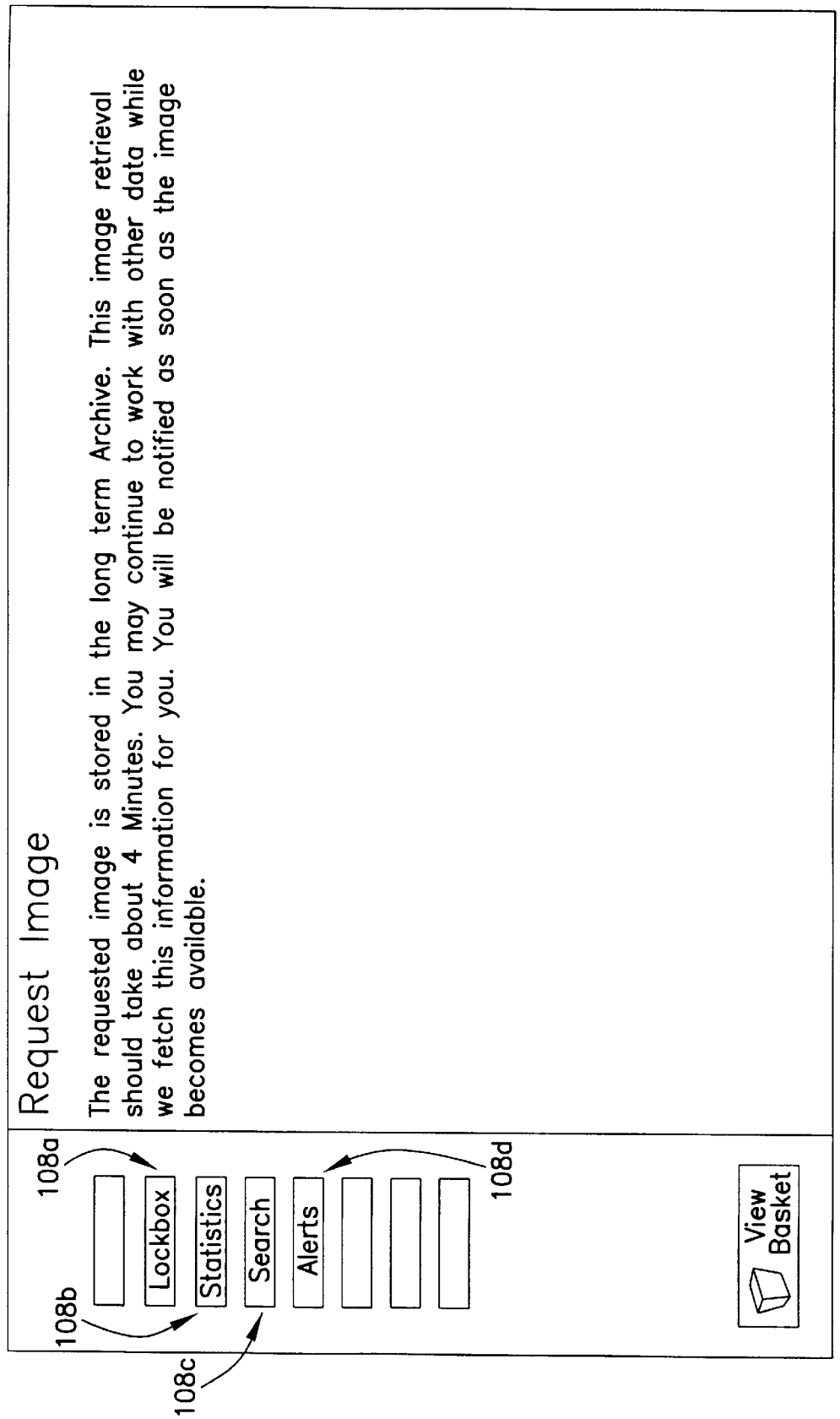
FIG. 10 is another screen format provided by the system shown in FIG. 1 to a user.

With reference to FIGS. 9 and 10, screen formats are shown which indicate that an external customer 22 has requested a check having an image file (or files) 17*a* which is in long term storage and, therefore, requires the customer to wait for the image file 17*a* and/or index files 17*b* to be obtained. Typically, an image file 17*a* will take longer to retrieve from storage unit 14 than an index file 17*b* and, therefore, a "Request Image" message appears on the screen format of FIG. 9 at location 138. Although the information contained in the index file 17*b* for the check of interest may be obtained relatively quickly and displayed at location 136, the customer is presented with a screen format (FIG. 10) which states that the image is stored in a long term archive and will be available after a period of time has elapsed, for example, four minutes. Once the information contained in both the image files 17*a* and index files 17*b* is available, the information may be manipulated by the external customer 22 in a substantially similar way as discussed hereinabove with respect to FIGS. 7 and 8.

Statistics Function

In accordance with the present invention, it is desirable to provide the external customer 22 with statistical information regarding the checks received by the customers in the one or more lockboxes during a period of time. To this end, the system 10 preferably provides statistical analysis functions 140 such as those listed in FIG. 11. In particular, FIG. 11 shows a screen format which is transmitted to an external customer 22 by the system 10 when the statistics icon 108*b* is selected at any of the screen formats shown in, for example FIGS. 4–10.

The statistical functions 140 may include the volume of checks received into one or more lockboxes during a period of time, for example, each day, month, or year. Alternatively, information concerning a particular remitter of checks may be provided in a report by selecting the remitter analysis option. While three specific statistical functions 140 are illustrated, fewer, more and/or different functions can be provided.

In general, the statistical analysis functions 140 preferably provide a chart or charts in which the information regarding lockbox receipts (e.g., checks) is presented as a function of the data of at least one field of one or more index files 17*b*.

Figure 12A:
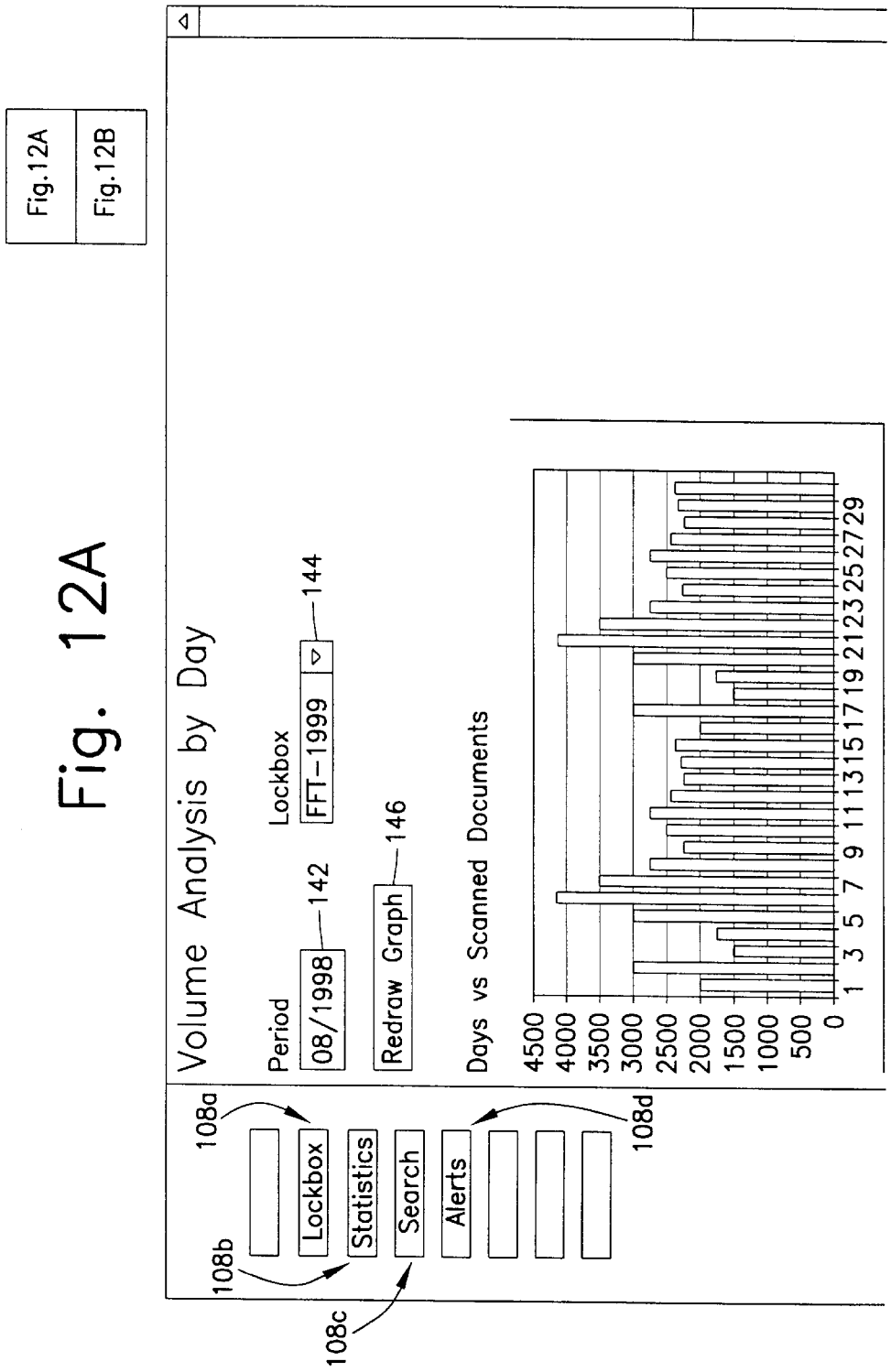
FIG. 12 is another screen format provided by the system shown in FIG. 1 to a user.
Figure 12B:
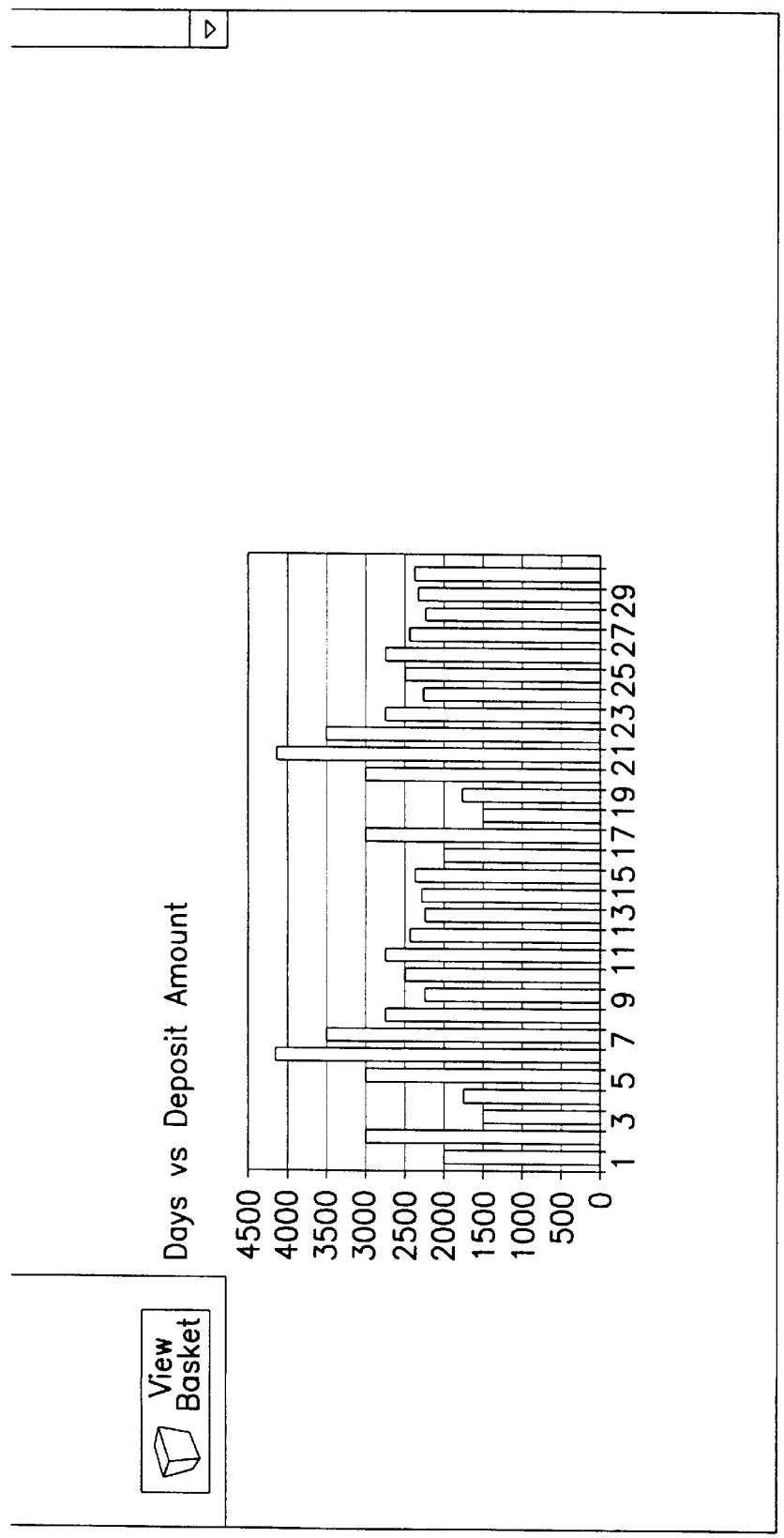

When an external customer 22 selects the volume analysis by day option 140, the system 10 preferably provides the external customer 22 with at least one screen format containing information representing an aggregate number of receipts (e.g., checks) received in one or more lockboxes over the specified period of time (i.e., one day). It is most preferable that the screen format provide a chart presenting information on aggregate numbers of receipts received in one or more lockboxes over a plurality of periods of time (i.e., a number of days). As shown in FIG. 12, the system 10 is capable of transmitting a screen format providing a chart showing the days of a month along an abscissa axis and the corresponding aggregate number of documents scanned along an ordinate axis. The aggregate number of documents may represent the number of checks received by the lockboxes or a total number of documents (checks and associated documents, e.g., invoices, letters, etc.) scanned.

The external customer 22 may select the period at location 142 and the specific lockbox number at location 144 (for example, using a pull down menu). In the illustrated example, the information is provided for lockbox number 1999 during August 1998. If the customer 22 wishes to change the period or lockbox number, it may do so and then click on the "Redraw Graph" icon 146 to update the charts. Accordingly, the external customer 22 may advantageously be provided with statistical analysis regarding its lockboxes.

It is preferred that the volume analysis by day option 140 also provide a chart showing an aggregate of the payment amounts of the checks received in a lockbox or lockboxes over a specified period of time (preferably selected by the customer 22, e.g., one day). It is also desirable that the external customer 22 be presented with information regarding aggregates of payment amounts of checks received in one or more lockboxes over a plurality of periods of time (i.e., the days of a month). Referring to FIG. 12, the volume analysis by day option screen format provides the external customer 22 with information regarding aggregate payment amounts of checks received in the customer's lockboxes for the days of a month.

Again, the external customer 22 may preferably select the period at location 142 and the specific lockbox number at location 144 for the payment amounts of interest. In the illustrated example, the information is provided for lockbox number 1999 during August 1998.

Figure 13B:
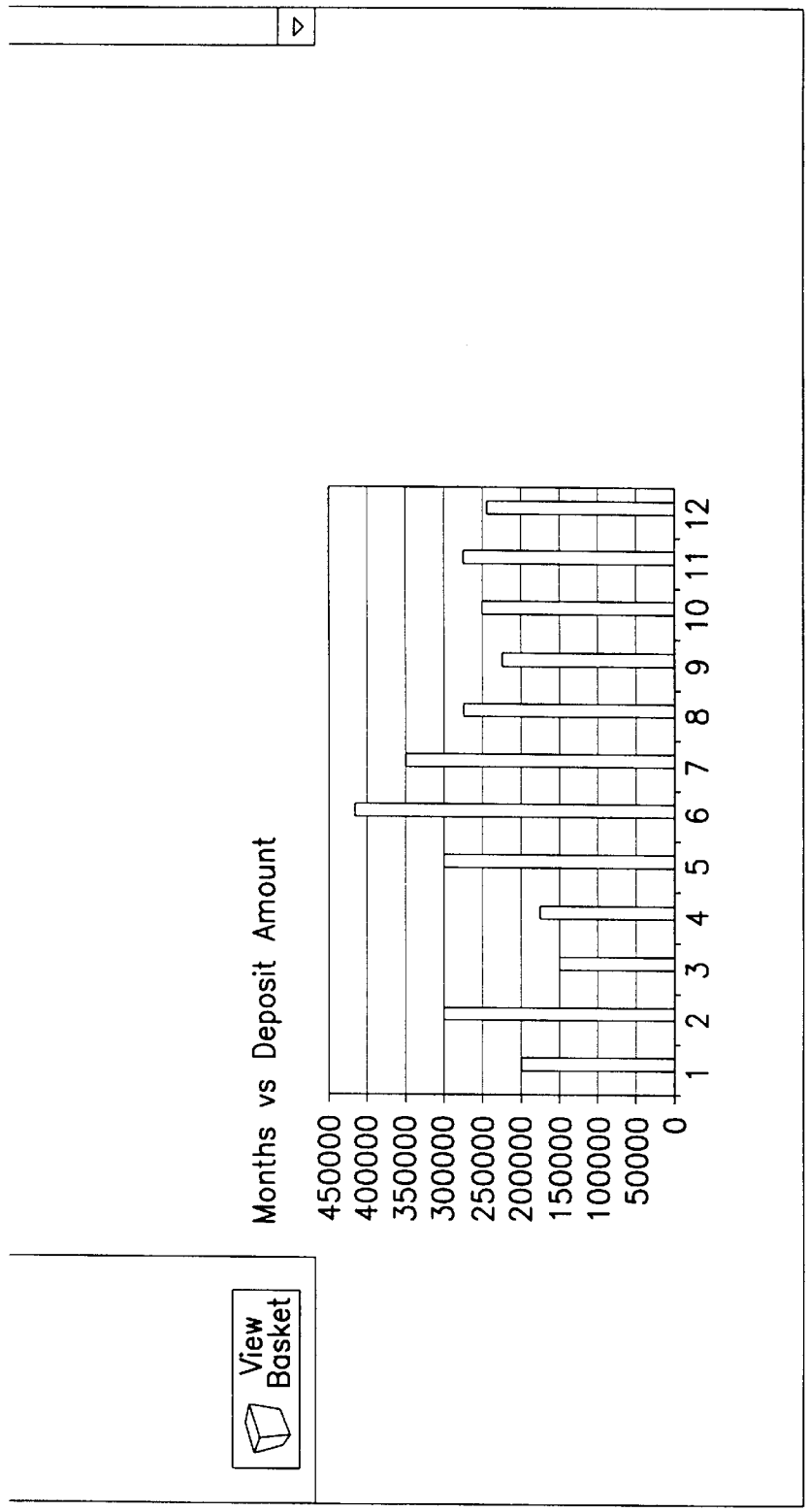
FIG. 13 is another screen format provided by the system shown in FIG. 1 to a user.

With reference to FIGS. 11 and 13, when the customer selects the volume analysis by month icon 140 (FIG. 11), the system 10 provides a screen format showing charts which provide information concerning the customer's lockboxes over one month increments, totalling, for example, a year. The external customer 22 may select the period at location 148 and the specific lockbox number at location 150 (for example, using a pull down menu). In the illustrated example, the information is provided for lockbox number 1999 during all of 1997. If the customer 22 wishes to change the period or lockbox number, it may do so and then click on the "Redraw Graph" icon 152 to update the chart.

Figure 14:
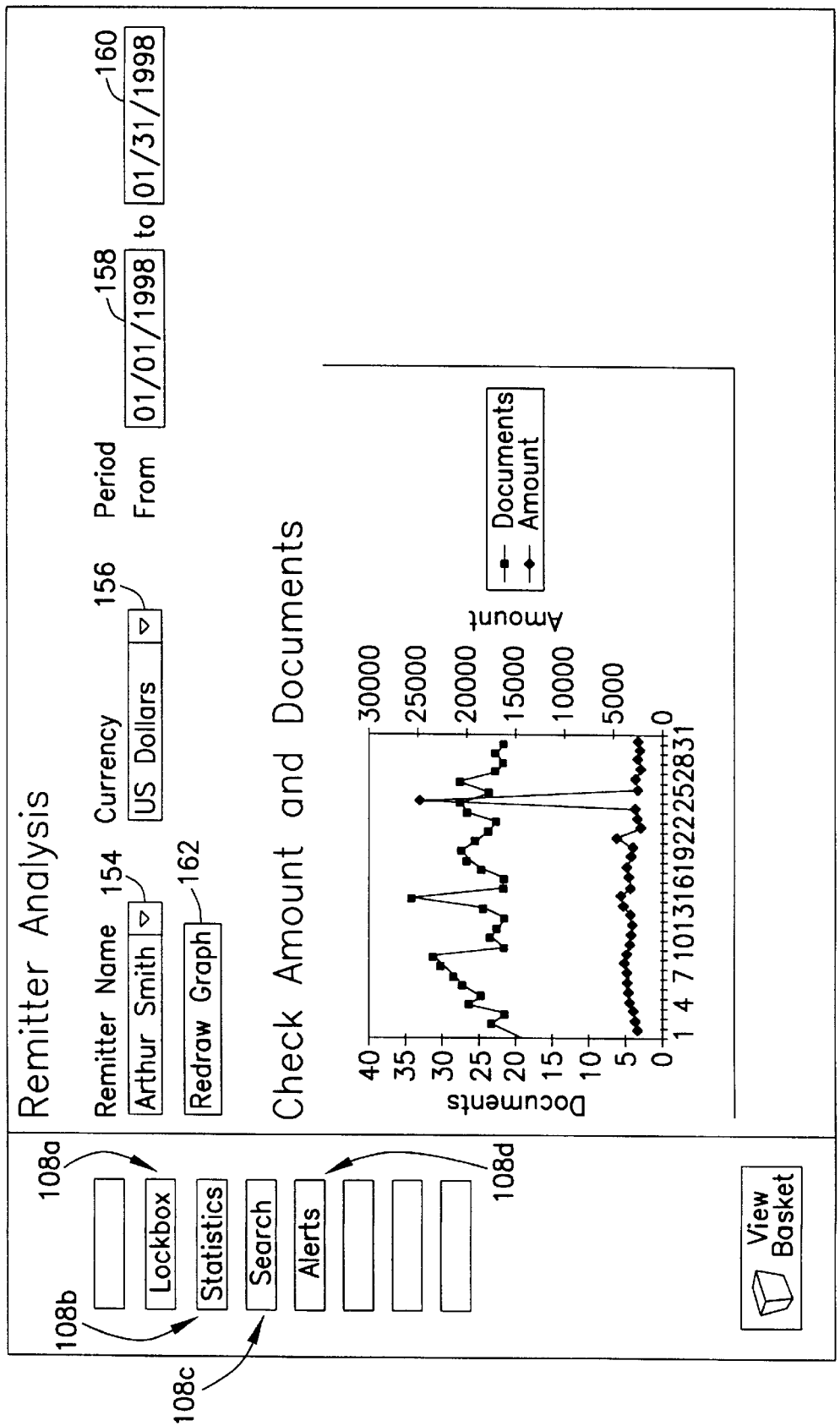
FIG. 14 is another screen format provided by the system shown in FIG. 1 to a user.

The information provided in the charts shown in FIGS. 12 and 13 relates to the receipts received in one or more lockboxes irrespective, for example, of whether those checks contain different remitter names. With reference to FIGS. 11 and 14, the information concerning receipts received in a particular customer's lockboxes may be refined to relate only to one or more specified remitters. This is accomplished by selecting the Remitter Analysis icon 140 (FIG. 11).

The external customer 22 may preferably select a particular remitter name by entering the name at location 154 (FIG. 14). The customer 22 may also limit the statistical analysis to checks of a particular currency by entering the currency type at location 156. The external customer 22 may select the period at locations 158, 160. In the illustrated example, the information is provided for checks received having a remitter name of Arthur Smith and currency in U.S. Dollars where the checks were received between Jan. 1, 1998 and Jan. 31, 1998. If the customer 22 wishes to change the remitter name, currency, and/or period, it may do so and then click on the "Redraw Graph" icon 162 to update the chart.

The chart may preferably include both aggregates of the payment amounts of the receipts and aggregates of the numbers of documents received in one or more lockboxes of the external customer 22.

Many other types of statistical analysis (whether in chart form or otherwise) may be provided to an external customer 22. The analysis may contain information which is a function of the data within the fields of the index files 17b. For example, the external customer 22 may receive a screen format containing information presented in a chart which is a function of the aggregate of the payment amounts of the receipts deposited into and withdrawals made from the customer's checking account over a specified period or specified periods of time. Such a chart provides cash flow statistical analysis to the external customer 22. It is noted that the cash flow analysis may be presented in periods of days, months, years, or the like.

It will be apparent to those skilled in the art from the above teaching that other charts may be presented to the external customer 22 by the system 10 relating to the information contained in the index files 17b. For example, the system 10 may provide the external customer 22 with information concerning the so-called float of one or more of the customer's checking accounts. This is accomplished by presenting the external customer 22 with a screen format containing a chart which is a function of the difference between a clearing date for a particular check and a posting date for the check. The system 10 may obtain data for the statistical analysis from files other than the index files 17b. For example, when the posting dates and clearing dates for particular checks are more conveniently stored in files other than the index files 17b, the system 10 may obtain such information using communication links to those files.

Search Function

It is desirable to provide the external customer 22 with a substantially open ended ability to search the data contained in the index files 17b to retrieve relevant information concerning the receipts received in the customer's lockboxes. To this end, system 10 preferably provides the external customer 22 with a screen format (FIG. 15) which permits the external customer 22 to perform a relatively simple search or an advanced search. Boolean or other logic based search facilities may be provided.

The simple search option preferably provides the external customer 22 with the capability of searching the information contained in the system 10 according to at least one of the remitter name 170, the payment amount (or check amount) 172 of the check, and the invoice number 174 associated with a particular check. As the remitter name, payment amount, and invoice number represent fields of the index files 17b, the external customer 22 is permitted to enter a value (or condition) at location 176 which, if matched by the data contained in a field of an index file 17b, would satisfy the condition.

Figure 15:
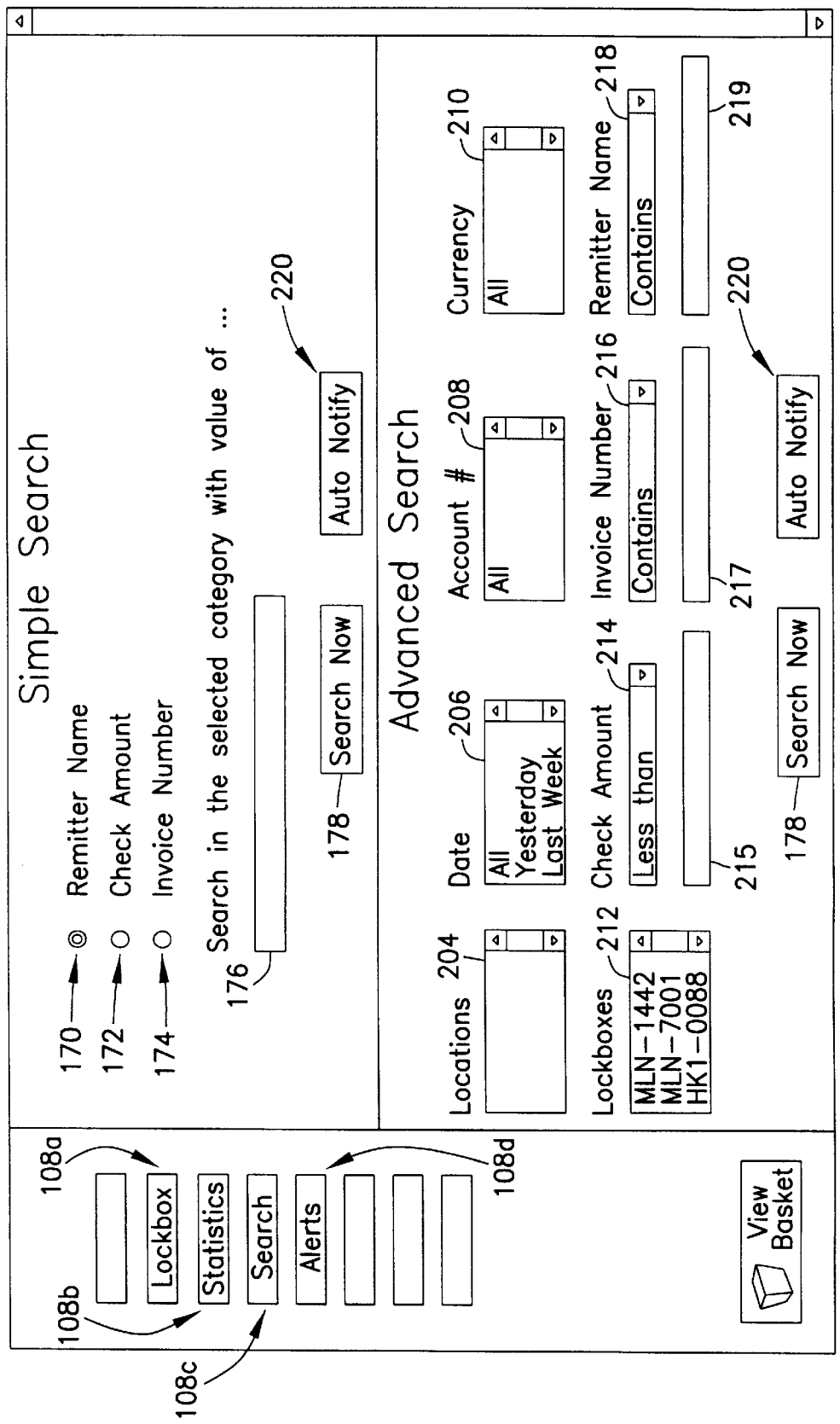
FIG. 15 is another screen format provided by the system shown in FIG. 1 to a user.

For example, in the Simple Search portion of the screen format shown in FIG. 15, the external customer 22 selected a search by remitter name 170. It is assumed that the external customer 22 specifies a value for the remitter name field of "Smith" and enters this into location 176. These selections represent search criteria specified by the customer 22. When the customer selects the Search Now icon 178, the system 10 searches the database containing the index files 17b for the receipts received in the customer's lockboxes for remitter name fields containing the value of "Smith."

FIG. 16 shows a screen format produced by system 10 which reports the results of the Search Now 178 option of the index files 17b for a particular customer containing the value "Smith" in the remitter name field. The search results are preferably tabulated to show lockbox location 180, processing date 182, lockbox number 184, batch number 186, receipt sequence number 188, payment amount 190, and remitter name 200. It is noted that the value "Smith" appears in each of the remitter names 200.

Preferably the external customer 22 is provided with the option to display a specified number of records (i.e., index files 17b) by entering the number at location 202. As the external customer 22 has selected the first ten records, the search result chart shows the first ten index files 17b meeting the search criteria.

Referring again to FIG. 15, the external customer 22 may formulate an advanced search based on one or more fields of the index files 17b. It is preferred that the advanced search include search criteria relating to the lockbox location 204, processing date 206, customer account number 208, currency type 210, lockbox numbers 212, payment amount (or check amount) 214, invoice number 216 and/or remitter name 218. Pull down menus are preferably employed to facilitate receiving selections from the customer 22 concerning the lockbox location 204, processing date 206, customer account number 208, currency type 210, and lockbox numbers 212. Data input windows 215, 217, and 219 are preferably employed to facilitate receiving selections from the customer 22 concerning the payment amount (or check amount) 214, invoice number 216 and/or remitter name 218, respectively.

The searching criteria may be directed to any of the fields contained in the index files 17b, the above search criteria being specified by way of example only.

Alert Function

In accordance with the invention, it is desirable to provide the external customer 22 with the ability to specify alert criteria such that the external customer 22 will be automatically notified when one or more specified receipts have been received which meet the alert criteria. For example, system 10 may preferably permit the customer to define a set of alert criteria containing certain alert conditions, where the alert criteria define, among other things, certain of the fields of the index files 17b to be monitored and the alert conditions define values (or data) contained in those fields. Therefore, when a index file 17b is received by the system 10 containing data in its fields which meet the alert conditions set forth in the alert criteria, the external customer 22 is alerted that one or more index files 17b contain data that have met the alert criteria.

It is preferred that an external customer 22 be permitted to specify its alert criteria at the search screen format (FIG. 15) by clicking on the Auto Notify icon 220. The Auto Notify icon 220 may be invoked during a simple or advanced search. Advantageously, the system 10 permits the customer 22 to utilize the search criteria as alert criteria simply by invoking the Auto Notify icon 220 rather than the Search Now icon 178.

By way of example, it would be advantageous to an external customer 22 to be notified that the payment amount from a particular check has been deposited in the customer's checking account. The system 10 is capable of automatically notifying the external customer 22 when a receipt (check, invoice, etc.) is received. This is accomplished by permitting the customer to specify that the alert criteria include a specific check number, payment amount, etc. The external customer 22 specifies the alert criteria by entering it into the input fields at, for example, advanced search locations 204, 206, 208, 210, 212, and 214–219. The customer then selects the Auto Notify icon 220 which causes the search criteria to be used as alert criteria. The system 10 then applies the alert criteria against the data (or values) contained in the fields of index files 17b received by system 10 in the future.

By way of example, FIG. 17 illustrates seven sets of alert criteria which have been stored by the customer 22. The first alert criteria 222 includes an alert condition specifying a particular invoice number (YHM137565651) of interest to a particular customer 22. Thus, the customer 22 is sent an alert when a receipt having an invoice with the number YHM137565651 is received. It is noted that portions of invoice numbers may also be specified (see, for example, the seventh alert criteria 234 specifying invoice numbers which start with "NVI").

The second alert criteria 224 includes an alert condition specifying a particular remitter name (Arthur Smith) of interest. Thus, the customer is sent an alert when a receipt having Arthur Smith as the remitter is received.

Figure 18:
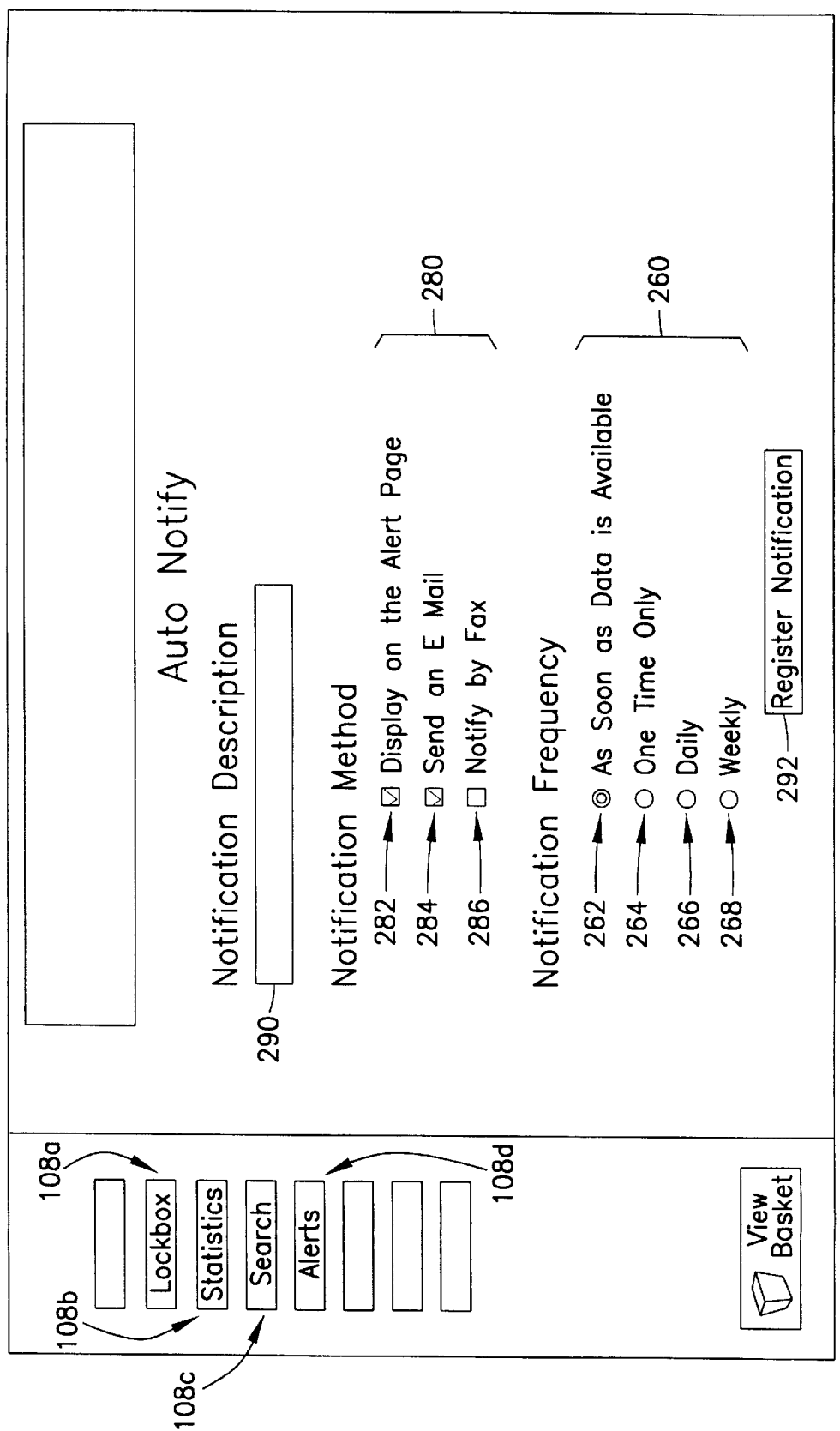
FIG. 18 is another screen format provided by the system shown in FIG. 1 to a user.

As it is advantageous for an external customer 22 to be automatically notified that a payment amount which exceeds a threshold value has been received, it is preferred that the external customer 22 be permitted to specify a payment amount threshold value which defines a minimum payment amount which meets the alert criteria. To this end, the customer 22 has set the third alert criteria 226 to include an alert condition specifying a lower threshold on a payment amount (i.e., payments greater than $2000). Thus, the customer 22 is sent an alert when a receipt having a payment amount in excess of $2000 is received. It is noted that a plurality of receipts may be received in a given period which meet this criteria. Accordingly, the customer 22 is preferably provided with an option to specify a period of time during which the alert criteria are applied against incoming receipts before an alert is produced. This is discussed in more detail hereinbelow (FIG. 18).

Alternatively, it may be advantageous for an external customer 22 to be automatically notified whenever a check is received having a payment amount less than a particular value. Accordingly, the system 10 may provide the external customer 22 with the ability to specify a payment amount threshold value defining a maximum payment amount which meets the alert criteria.

The fourth alert criteria 228 includes an alert condition specifying a particular lockbox location (Frankfurt) of interest. Thus, (assuming the customer 22 has specified a period of time over which the alert criteria is to be applied) the customer 22 is sent an alert listing all receipts which are deposits to its Frankfurt lockbox(es) during the specified period.

The fifth alert criteria 230 includes an alert condition specifying a particular period of time (e.g., "last week") for which deposits are of interest. Thus, the customer is sent an alert listing all deposits received the previous week.

The sixth alert criteria 232 includes an alert condition specifying a particular lockbox location (Hong Kong) and period of time ("last month") of interest. Thus, the customer 22 is sent an alert listing all receipts which are deposits to its Hong Kong lockbox(es) during the previous month.

It is preferred that the external customer 22 be permitted to specify many combinations of alert conditions which are functions of the fields contained in the index files 17b, the above being provided by way of example only.

Once the external customer 22 has specified the one or more alert criteria 222–234, it may delete one or more of them using the Delete/Go icon 50.

Referring to FIG. 18, it is preferable to provide the external customer 22 with the ability to define the Response Time and Frequency 260 of the alert message. For example, it is preferred that the external customer 22 be permitted to specify that the alert message be sent out substantially as soon as possible 262, i.e., as soon as the alert criteria have been satisfied. Further, the screen format shown in FIG. 18 provides the external customer 22 with the ability to indicate that the alert criteria be applied only one time 264, daily 266, weekly 268, or the like.

Assuming that the customer 22 has specified that it wishes to be automatically alerted on a weekly basis, the system 10 applies the stored alert criteria 222–234 (FIG. 17) against the incoming receipts weekly. It is noted, therefore, that the Stored Alerts screen format of FIG. 17 includes a field containing a list of New and Old Matches 270. Taking the third alert criteria 226 as an example, the Matches field 270 indicates that there are no new receipts which match the criteria 226 but there are five previous matches (from previous weeks) of record.

Referring again to FIG. 18, it is preferred that the customer 22 be permitted to define at least one Notification Method 280 (i.e., one or more modes of communication) by which the customer desires to be alerted that an alert criteria has been met. These methods are preferably: posting an alert page notification on a screen format 282, providing an electronic mail message 284, providing a facsimile message 286, and providing a paging message to the customer over a remote pager (option not shown). In the illustrated example, the customer has selected to be alerted via an alert page and an e-mail message.

It is noted that the screen format of FIG. 18 also includes a Notification Description input field 290 in which the customer 22 may specify a label or other indicia which accompanies the alert. For example, when the customer 22 inputs the description "Weekly Alerts" in the field 290, the alert provided by the system preferably includes that description somewhere in the alert, such as the title, re, e-mail title, etc.

The system 10 is preferably capable of sending an alert notification to different parties depending on the Registration 292 set up by the customer 22. In particular, the customer 22 may specify (using the Registration icon 292)

that one party receive the alert page 282 and another party receive the e-mail 284 to facilitate more rapid and efficient processing on the customer side.

Figure 19A:
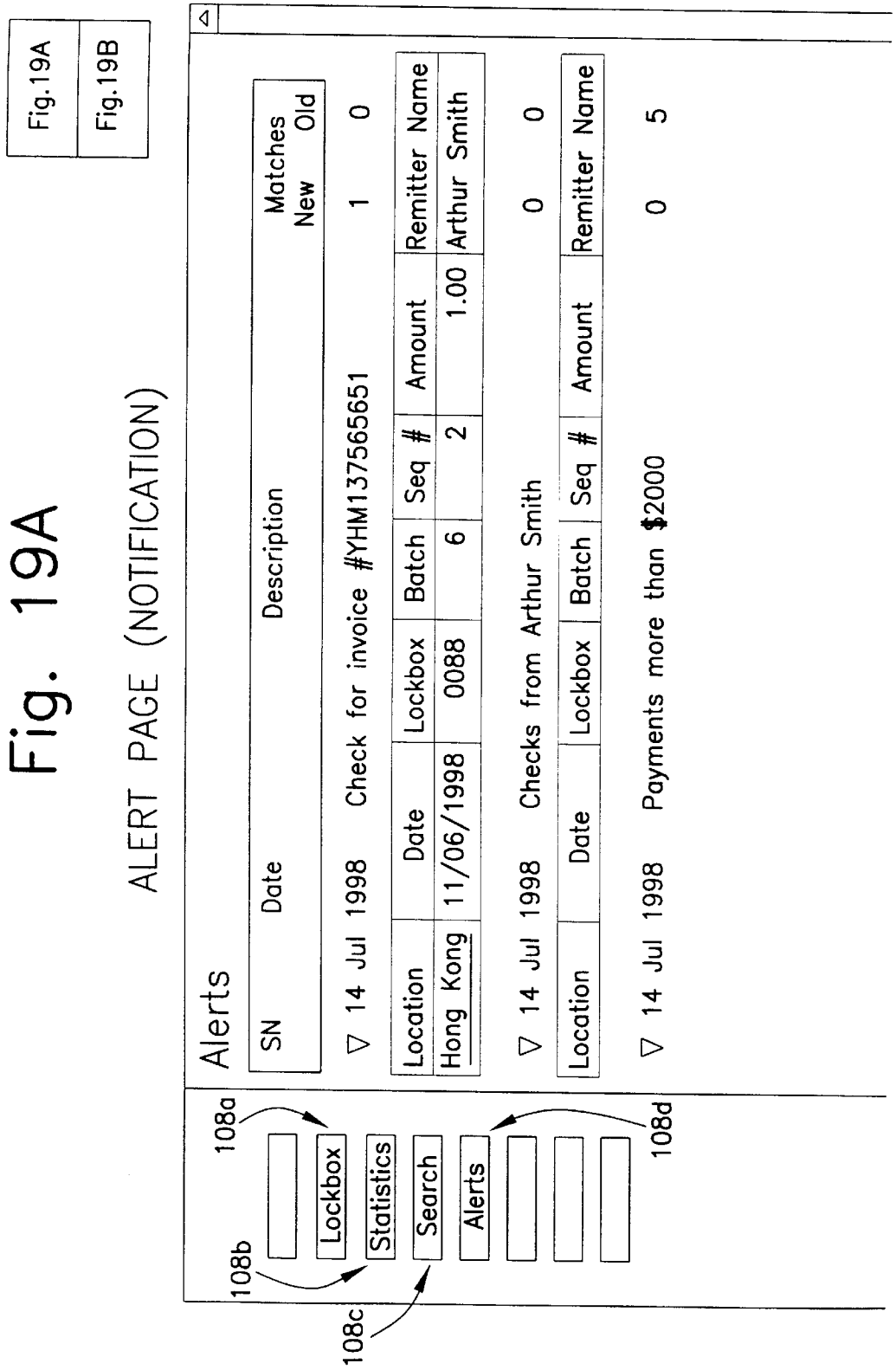
FIG. 19 is another screen format provided by the system shown in FIG. 1 to a user.

Reference is now made to FIG. 19 which shows an alert page provided by the system 10 to the external customer 22 as a result of applying the seven alert criteria 222–234 shown in FIG. 17. The mode of the alert message shown in FIG. 19 is the alert page 282 and is received by the customer, for example, when it accesses the system 10. The screen format of FIG. 19 may be scrolled down to show the results for the last three criteria. It is understood that when the external customer 22 selects the e-mail, fax, etc., modes of notification, the external customer 22 would also receive an alert message over those communication channels. It is noted that an e-mail alert notification 284 or facsimile alert notification 286 may, for example, look substantially similar to the alert page shown in FIG. 19. Other configurations are possible.

Accordingly, the external customer 22 may advantageously examine the alert notification results and take appropriate actions based thereon.

Look and Feel

According to the present invention, it is preferred that the system 10 be capable of automatically altering the "look and feel" of the interface between the external customer 22 and the system 10. In other words, with reference to FIGS. 2–19, it is preferred that the order and arrangement of the screen formats be automatically adjustable by the system 10 as a function of the way that the external customer 22 has manipulated the screen formats during prior sessions. For example, with reference to FIGS. 4 and 5, it is apparent that, in the first instance, the screen format of FIG. 4 is provided to the external customer 22 prior to the screen format of FIG. 5. Indeed, it is desirable to require the user to select the lockbox icon 108 prior to receiving the batch summary for the customer's lockboxes shown in the screen format of FIG. 5. It is also desirable, however, to automatically provide the screen format of FIG. 5 prior to the screen format of FIG. 4 (or omit the screen format of FIG. 4 entirely) if the history of how a particular external customer 22 has manipulated the screen formats indicates that the external customer 22 prefers to receive the screen format of FIG. 5 over other screen formats, for example, the screen format of FIG. 4.

It is therefore preferred that the system 10 monitor the numbers of times that the customer 22 commands one or more screen formats be provided to him. The system 10 may then automatically provide one screen format (e.g., FIG. 5) prior to (or instead of) another screen format (e.g., FIG. 4) as a function of the numbers of times that a customer 22 commands the respective screen formats be provided.

By way of example, the system 10 may provide one screen format prior to (or in lieu of) another screen format if the number of times that a particular external customer 22 commands the one screen format be provided exceeds the number of times that the customer commands the other screen format be provided.

It is apparent to one skilled in the art from the above teaching that the system 10 may eliminate the option for an external customer 22 to receive a particular screen format if the number of times that the customer commands that that screen format be provided is sufficiently small.

It is also preferred that certain of the options for the external customer 22 to receive corresponding screen formats be emphasized based on the number of times that the external customer 22 commands the screen format be provided. For example, with reference to FIG. 3, the image lockbox icon 104a may be enlarged or highlighted if the number of times that an external customer 22 selects the image lockbox icon 104a is sufficiently large.

It is also preferred that the system 10 be provided with the capability of recognizing that the plurality of customers 20, 22 may be classified into one or more groups and that different sets of screen formats be provided to the different groups of customers based on the group classification. For example, internal customers 20 may be provided with the information contained in the image files 17a and index files 17b according to one set of screen formats while the external customers 22 may be provided with the information of the image and index files 17a, 17b according to a different set of screen formats.

Further, it is preferred that the system 10 recognize that the customers may be divided into groups based on technical sophistication, priority level, customer size (e.g., number of users, corporation size, etc.) and the type of financial services that the customers utilize with the financial service provider. It is noted that the priority level, customer size, and the type of financial services provided to the customer may be determined when the customer signs up for the services provided by the system 10. Although the technical sophistication of the customer may also be obtained in this way, technical sophistication may also be determined by monitoring how the customer interacts with the system 10.

For example, the system 10 may monitor a number of times that the customer accesses a particular one or more of the screen formats and recognize that some screen formats are accessed only by sophisticated customers. In response, it is preferred that the system 10 automatically alter at least one of the sets of screen formats provided, the number and order that the screen formats are provided, and the orientation of the information provided on the screen formats.

It is noted that the system 10 may also determine a level of familiarity that an external customer 22 has with the one or more screen formats provided to the customer by monitoring the number of times that the customer accesses particular screen formats of the system 10. In response, it is preferred that the system 10 automatically alter at least one of the different sets of screen formats provided to the customer, the order in which the screen formats are provided to the customer, and the arrangement of the information provided on the screen formats.

By way of example, if the system 10 determines that a particular external customer 22 has a high level of familiarity with the system 10 and or has a high level of sophistication by monitoring the number of times that the external customer 22 accesses one or more particular screen formats, the system 10 may automatically alter the information and options provided, for example, on the screen format shown in FIG. 15. Indeed, if the system 10 determines that the external customer 22 is a sophisticated customer, it is preferred that the system 10 provide that customer with only the advanced search options or locating the simple search options on another screen format (obtainable by way of an icon for example).

The foregoing description of the preferred embodiments of the present invention have been provided for the purpose of illustration and description. They are not intended to be exhaustive or to limit the invention to the precise forms disclosed. Many modifications and variations are possible to one skilled in the art in view of the above teaching. It is intended that the scope of the invention be limited not by this detailed description, but rather by the claims appended hereto.

What is claimed is:

1. A method of providing information regarding lockbox receipts to a customer having a lockbox account, the method comprising the steps of:

having alert criteria containing alert conditions selected by the customer;

creating a database file for each of the receipts of the lockbox account which are received after the customer has selected the alert criteria, each of the database files comprising a plurality of fields containing confidential financial data relating to a respective one of the receipts, the alert criteria defining certain of the fields as containing confidential financial data to be compared against the alert conditions;

maintaining the database files on a secure computer system;

comparing the alert conditions with the confidential financial data of the fields of the database files defined by the alert criteria;

transmitting a non-confidential alert message to the customer over at least one communication channel, the non-confidential alert message indicating that one or more of said database files contain confidential financial data that have met the alert criteria; and further comprising:

requiring the customer to access the secure computer system if the customer desires access to said one or more of the database files containing confidential financial data that have met the alert criteria; and authenticating the customer to ensure that security of said one or more of the files is maintained.

2. The method of providing information regarding lockbox receipts of claim 1, wherein the alert criteria include at least one mode of communication by which the alerting step is to be accomplished.

3. The method of providing information regarding lockbox receipts of claim 2, wherein the at least one mode of communication is taken from the group consisting of posting an alert notification, providing an electronic mail message, providing a facsimile message, and providing a paging message.

4. The method of providing information regarding lockbox receipts of claim 1, wherein the lockbox receipts comprise negotiable instruments.

5. The method of providing information regarding lockbox receipts of claim 4, wherein the lockbox receipts are checks.

6. The method of providing information regarding lockbox receipts of claim 5, wherein the fields containing data relating to respective checks include at least one of a remitter name of the check, a serial number of the check, a bank number of the check, a routing number of the check, a payment amount of the check, a checking account number of the customer into which the payment amount is deposited, a posting date on which the payment amount is deposited into the checking account of the customer, a clearing date on which the payment amount clears, a lockbox number in which the check is received, a location of the lockbox, an ON-US account number into which the check is deposited, a batch number for a batch of checks of which the check is a part, a sequence number of the check within the batch, a release time for the batch number, an aggregate payment amount of the batch, a number of an invoice associated with the check, a currency type of the check, a processing date of the check, and a document type of an image file of the check.

7. The method of providing information regarding lockbox receipts of claim 6, wherein the fields defined by the alert criteria as containing data to be compared against the alert conditions include at least one of the remitter name, the payment amount, and the invoice number.

8. The method of providing information regarding lockbox receipts of claim 6, wherein the fields defined by the alert criteria as containing data to be compared against the alert conditions include at least one of the remitter name, the payment amount, the invoice number, the lockbox number, the lockbox location, the processing date, the customer checking account number, and the currency type.

9. The method of providing information regarding lockbox receipts of claim 6, wherein the alert conditions against which the data of the fields defined by the alert criteria are compared include at least one of a specific remitter name, a payment amount threshold value defining a minimum payment amount which meets the alert criteria, a payment amount threshold value defining a maximum payment amount which meets the alert criteria, a specific payment amount, a specific invoice number, one or more specific lockbox numbers, one or more specific lockbox locations, one or more processing dates, one or more specific customer checking account numbers, and one or more currency types.

10. The method of providing information regarding lockbox receipts of claim 1, wherein the fields available to the customer to be defined by the alert criteria as containing data to be compared against the alert conditions vary as a function of the specific customer.

11. The method of providing information regarding lockbox receipts of claim 1, wherein the alert criteria include a period during which the alert conditions are compared against the receipts, the comparing of the alert conditions with the receipts not being permitted outside the period.

12. The method of providing information regarding lockbox receipts of claim 11, further comprising the step of notifying the customer when no files contain data that have met the alert criteria during the period.

13. The method of providing information regarding lockbox receipts of claim 1, wherein the alert criteria include a command to alert the customer substantially as soon as one or more receipts meet the alert conditions of the alert criteria.

14. The method of providing information regarding lockbox receipts of claim 1, wherein the alert criteria include a command to alert the customer only once whether one or more of the receipts meet the alert conditions of the alert criteria.

15. The method of providing information regarding lockbox receipts of claim 1, wherein the alert criteria include a command to alert the customer periodically whether one or more of the receipts meet the alert conditions of the alert criteria.

16. The method of providing information regarding lockbox receipts of claim 15, wherein the period is one of hourly, daily, weekly, and monthly.

17. The method of providing information regarding lockbox receipts of claim 1, wherein the alert includes a list of the data of the receipts which have met the alert criteria.

18. The method of providing information regarding lockbox receipts of claim 17, wherein the alert includes a list of certain of the fields of the files which contain data that have met the alert criteria.

19. The method of providing information regarding lockbox receipts of claim 1, wherein the alert includes descriptions of the alert conditions and respective lists of the receipts which have met the alert conditions.

20. A method of providing information regarding lockbox receipts to a customer having a lockbox account, the method comprising:

creating a database file on a secure computer system for each of the receipts of the lockbox account, each of the database files comprising a plurality of fields containing confidential financial data relating to a respective one of the receipts;

producing a statistical report in which confidential financial information regarding the lockbox receipts is presented as a function of the confidential financial data of at least one database field;

requiring the customer to access the secure computer system if the customer desires to access said report, the access by the customer being over a communication channel; and authenticating the customer to ensure security of said report.

21. The method of providing information regarding lockbox receipts of claim 20, wherein the information presented in the report is a function of an aggregate number of receipts received in the lockbox account over a specified period of time.

22. The method of providing information regarding lockbox receipts of claim 21, wherein the period of time is one day, month or year.

23. The method of providing information regarding lockbox receipts of claim 21, wherein the information presented in the report shows aggregate numbers of receipts received in the lockbox account over specified periods of time.

24. The method of providing information regarding lockbox receipts of claim 23, wherein the periods of time are a progression of days, months, or years.

25. The method of providing information regarding lockbox receipts of claim 20, wherein the information presented in the report is related only to one specified remitter.

26. The method of providing information regarding lockbox receipts of claim 25, wherein the information presented in the report is a function of an aggregate number of receipts received in the lockbox account over a specified period of time.

27. The method of providing information regarding lockbox receipts of claim 26, wherein the period of time is one day, month or year.

28. The method of providing information regarding lockbox receipts of claim 26, wherein the information presented in the report shows aggregate numbers of receipts received in the lockbox account over specified periods of time.

29. The method of providing information regarding lockbox receipts of claim 28, wherein the periods of time are a progression of days, months, or years.

30. The method of providing information regarding lockbox receipts of claim 20, wherein the lockbox receipts are checks.

31. The method of providing information regarding lockbox receipts of claim 30, wherein the fields containing data relating to respective checks include a payment amount of the check and the information presented in the report is a function of an aggregate of the payment amounts of the checks received in the lockbox account over a specified period of time.

32. The method of providing information regarding lockbox receipts of claim 31, wherein the period of time is one day, month or year.

33. The method of providing information regarding lockbox receipts of claim 31, wherein the information presented in the report shows aggregates of payment amounts of the checks received in the lockbox account over specified periods of time.

34. The method of providing information regarding lockbox receipts of claim 33, wherein the periods of time are a progression of days, months, or years.

35. The method of providing information regarding lockbox receipts of claim 30, wherein the fields containing data relating to respective checks include a payment amount of the check and the information presented in the report is a function of (i) an aggregate of the payment amounts of the checks, and (ii) an aggregate number of checks, received in the lockbox account over a specified period of time.

36. The method of providing information regarding lockbox receipts of claim 35, wherein the period of time is one day, month or year.

37. The method of providing information regarding lockbox receipts of claim 35, wherein the information presented in the report shows aggregates of payment amounts of the checks received in the lockbox account over specified periods of time.

38. The method of providing information regarding lockbox receipts of claim 37, wherein the periods of time are a progression of days, months, or years.

39. The method of providing information regarding lockbox receipts of claim 30, wherein the fields containing data relating to respective checks include a payment amount of the check which is deposited into a customer checking account, the information presented in the report being a function of an aggregate of the payment amounts of the checks deposited in and withdrawals made from the customer checking account over a specified period of time.

40. The method of providing information regarding lockbox receipts of claim 39, wherein the period of time is one day, month or year.

41. The method of providing information regarding lockbox receipts of claim 39, wherein the information presented in the report shows aggregates of the payment amounts of the checks deposited in and withdrawals made from the customer checking account over specified periods of time.

42. The method of providing information regarding lockbox receipts of claim 41, wherein the periods of time are a progression of days, months, or years.

43. The method of providing information regarding lockbox receipts of claim 30, wherein the fields containing data relating to respective checks include (i) a payment amount of the check which is deposited in a customer checking account, (ii) a posting date on which the payment amount is deposited into the checking account of the customer, and (iii) a clearing date on which the payment amount clears, the information presented in the report being a function of a difference between the clearing date and the posting date.

* * * * *